(12) United States Patent
Makh et al.

(10) Patent No.: US 9,370,019 B2
(45) Date of Patent: Jun. 14, 2016

(54) TIME-SHARED AND CONCURRENT MULTI-PROTOCOL BEACON TRANSMISSION DESIGN

(71) Applicant: QUALCOMM Incorporated, San Diego, CA (US)

(72) Inventors: Vansh Pal Singh Makh, San Francisco, CA (US); Chirag Sureshbhai Patel, San Diego, CA (US); Yeliz Tokgoz, San Diego, CA (US); Mehmet Yavuz, San Diego, CA (US); Joseph Soriaga, San Diego, CA (US); Rahul Dangui, New York, NY (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 14/301,258

(22) Filed: Jun. 10, 2014

(65) Prior Publication Data

US 2014/0362789 A1 Dec. 11, 2014

Related U.S. Application Data

(63) Continuation of application No. 13/363,086, filed on Jan. 31, 2012, now Pat. No. 8,792,532.

(60) Provisional application No. 61/438,644, filed on Feb. 1, 2011.

(51) Int. Cl.
*H04W 4/00* (2009.01)
*H04W 72/12* (2009.01)
(Continued)

(52) U.S. Cl.
CPC .......... *H04W 72/1263* (2013.01); *H04W 48/08* (2013.01); *H04W 48/12* (2013.01); *H04W 60/00* (2013.01); *H04W 84/045* (2013.01)

(58) Field of Classification Search
CPC . H04W 72/1263; H04W 48/08; H04W 60/00; H04W 48/12
USPC .......................................................... 370/329
See application file for complete search history.

(56) References Cited

U.S. PATENT DOCUMENTS

| 8,144,639 B1 | 3/2012 | Ghaus et al. |
| 2003/0054807 A1 | 3/2003 | Hsu et al. |

(Continued)

FOREIGN PATENT DOCUMENTS

| WO | WO-2010022287 A1 | 2/2010 |
| WO | WO-2010025348 A1 | 3/2010 |
| WO | WO-2010098104 A1 | 9/2010 |

OTHER PUBLICATIONS

Humblet, P., et al., "System design of CDMA2000 femtocells", IEEE Communications Magazine, Sep. 1, 2009, pp. 92-100, vol. 47, No. 9, IEEE Service Center, Piscataway, US, XP011283370, ISSN: 0163-6804, LNKDDOI: 10.1109/MC0M.2009.5277461, p. 97,98 Preferred User Zone List, Dual Mode Mobile issues.

(Continued)

*Primary Examiner* — Sai-Ming Chan
(74) *Attorney, Agent, or Firm* — Jia J. Wu

(57) ABSTRACT

A base station in a cellular wireless communications system uses one or more control algorithms to control a transmission pattern of a 1×RTT or DO discovery beacon. The transmission pattern enables access terminals using any one of multiple wake-up periods and wake-up offsets to discover all macrocell frequencies in a finite amount of time. In addition, for base stations allocating a single transmit chain to both 1×RTT and DO beacons, the transmission pattern enables a definite maximum discovery time for both 1×RTT and DO beacons for all access terminals entering the base station coverage.

18 Claims, 18 Drawing Sheets

(51) Int. Cl.
*H04W 48/12* (2009.01)
*H04W 48/08* (2009.01)
*H04W 60/00* (2009.01)
*H04W 84/04* (2009.01)

(56) References Cited

U.S. PATENT DOCUMENTS

| | | |
|---|---|---|
| 2009/0135754 A1 | 5/2009 | Yavuz et al. |
| 2010/0048212 A1 | 2/2010 | Yavuz et al. |
| 2010/0054219 A1* | 3/2010 | Humblet .............. H04W 48/12 370/338 |
| 2010/0203892 A1 | 8/2010 | Nagaraja et al. |
| 2010/0279714 A1 | 11/2010 | Chin et al. |
| 2010/0311416 A1 | 12/2010 | Abichandani et al. |
| 2011/0205969 A1 | 8/2011 | Ahmad et al. |
| 2011/0300863 A1 | 12/2011 | Iwata |
| 2012/0069823 A1 | 3/2012 | Low et al. |
| 2013/0028293 A1 | 1/2013 | Makh et al. |

OTHER PUBLICATIONS

International Search Report and Written Opinion—PCT/US2012/023555—ISA/EPO—Apr. 12, 2012.
Lee T.H., et al., "An Efficient 1-68 Scheduling Algorithm for Scheduled Automatic Power Save Delivery for Wireless LANs", 2010 IEEE Vehicular Technology Conference (VTC 2010-Spring)—May 16-19, 2010—Taipei, Taiwan, IEEE, US, May 16, 2010, pp. 1-5, XP031695998, ISBN: 978-1-4244-2518-1, abstract, sections I, II.A, II.B, III.A, III.B.
Sadaphal P.V., et al., "Random and Periodic sleep schedules for target detection in sensor networks", Mobile Adhoc and Sensor Systems, 2007. Mass 2007. IEEE International Co Nference On, IEEE, PI, Oct. 1, 2007, pp. 1-11, XP031200936, ISBN: 978-1-4244-1454-3 abstract sections I and IV.
Taiwan Search Report—TW101103289—TIPO—Dec. 24, 2013.

* cited by examiner

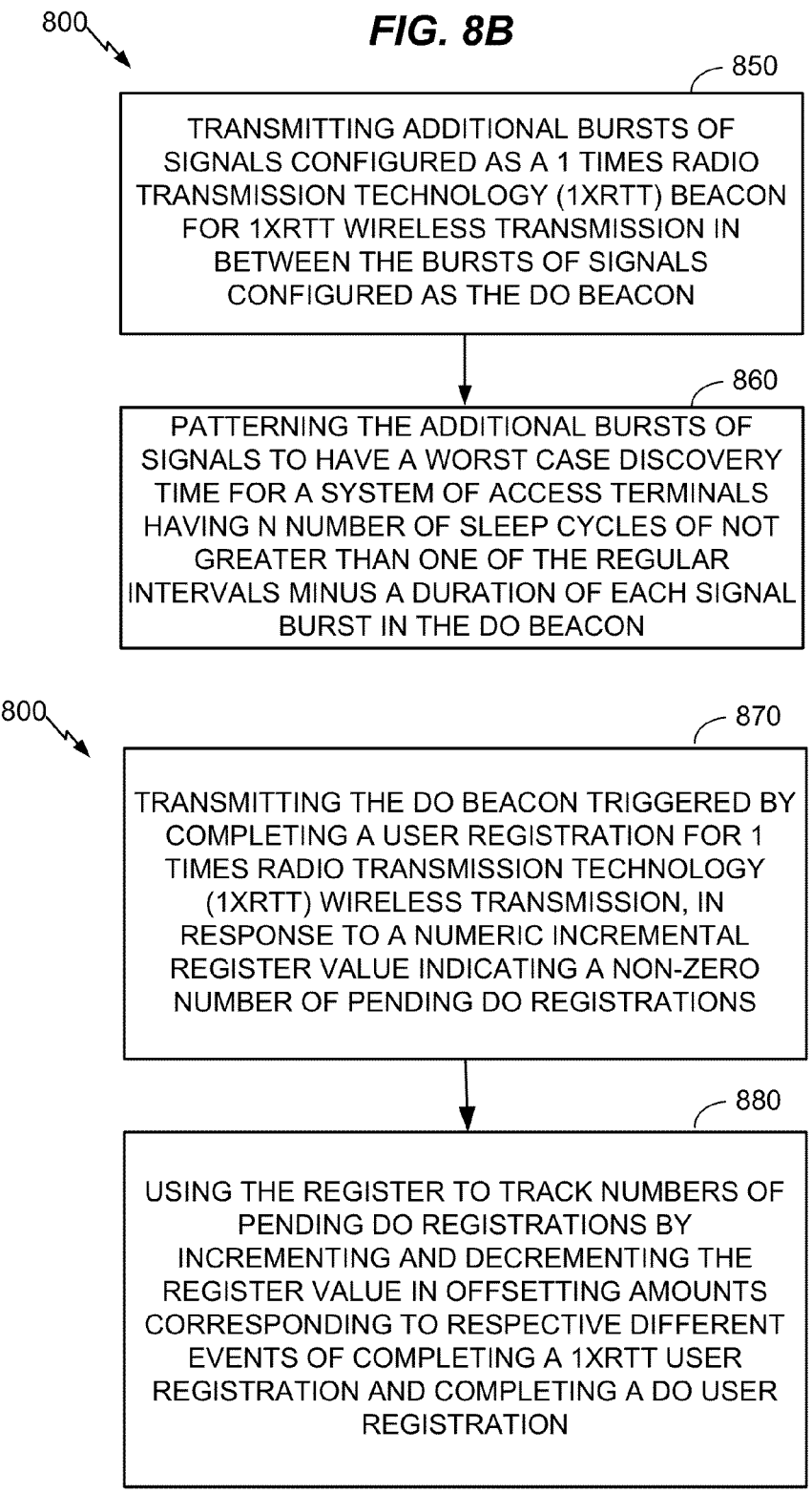

TIME-SHARED AND CONCURRENT MULTI-PROTOCOL BEACON TRANSMISSION DESIGN

CROSS-REFERENCE TO RELATED APPLICATION

This application is a continuation of U.S. application Ser. No. 13/363,086, filed Jan. 31, 2012, which claims priority under 35 U. S. C. §119 (e) to U.S. Provisional Patent Application No. 61/438,644, filed Feb. 1, 2011, entitled "TIME-SHARED AND CONCURRENT 1x/DO BEACON TRANSMISSION DESIGN" which applications are hereby incorporated by reference in their entireties.

FIELD

The present application relates generally to wireless communications, and more specifically to beacon transmission design to assist mobile access terminals in finding base stations.

BACKGROUND

The 3rd Generation Partnership Project (3GPP) Long Term Evolution (LTE) represents a major advance in cellular technology and is the next step forward in cellular 3G services as a natural evolution of Global System for Mobile communications (GSM) and Universal Mobile Telecommunications System (UMTS). The LTE physical layer (PHY) is a highly efficient means of conveying both data and control information between an evolved NodeB (eNB) and mobile entities (MEs), such as, for example, access terminals (ATs) or user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single-Carrier Frequency Division Multiple Access (SC-FDMA) on the uplink (UL). OFDMA allows data to be directed to or from multiple users on a subcarrier-by-subcarrier basis for a specified number of symbol periods.

Examples of older wireless communication systems widely deployed to provide various types of communication content such as voice and data include Code Division Multiple Access (CDMA) systems, including CDMA2000, Wideband CDMA, Global System for Mobile communications (GSM), Universal Mobile Telecommunication System (UMTS). These wireless communication systems and LTE systems generally use different radio access technologies (RATs) and communication protocols, operate at different frequency bands, provide different quality of service (QoS) and offer different types of services and applications to the system users.

Various wireless communication protocols may be used for communications between ATs and access points (APs) of a wireless communication system. For example, the 1xRTT protocol as defined by the Telecommunication Industry Association (TIA) in the TIA-2000 series specifications may be used for voice and certain data transmissions on CDMA systems up to 144 KBps. For further example, a 1x Evolution, Data Optimized (1xEV-DO) as defined 3GPP2 CS0024-0, version 4 and subsequent versions of this standard may be used for data transmissions up to about 600 KBps. Various other transmission protocols may also be used. A particular AP or base station may support two or more protocols independently to enable separate or simultaneous use of different protocols by the same or different access terminals.

When moving between AP coverage areas, an AT in idle mode may detect a beacon periodically transmitted by an AP in a new coverage area to discover that wireless connectivity is available using a particular wireless communication protocol. For example, an AT may detect a 1xRTT beacon for an available 1xRTT connectivity and a Data Optimized (DO) beacon for an available DO connectivity. However, when in idle mode the AT may only wake up and be enabled to detect beacon signals at limited intervals. Accordingly, undesirable delay may be introduced between the time that an AT first moves into a coverage area for an AP and detection of a beacon enabling discovery of an available connectivity via the AP.

In addition, a new class of small base stations for providing access to wireless communication systems has emerged, which may be installed in a user's residence or business to provide indoor wireless coverage to mobile units using existing broadband Internet connections. Such a base station is generally known as a femtocell access point (FAP), but may also be referred to as Home Node B (HNB) unit, Home evolved Node B unit (HeNB), femto cell, femto Base Station (fBS), base station, or base station transceiver system. Typically, the femto access point is coupled to the Internet and the mobile operator's network via a Digital Subscriber Line (DSL), cable internet access, T1/T3, or the like, and offers typical base station functionality, such as Base Transceiver Station (BTS) technology, radio network controller, and gateway support node services. This allows a Mobile Station (MS), also referred to as a cellular/mobile device or handset, Access Terminal (AT) or User Equipment (UE), to communicate with the femtocell access point and utilize the wireless service. This new class of small base stations may be subject to certain hardware or resource limitations with respect to beacon signaling, and further may be deployed in an ad hoc (unplanned) fashion. Such factors may further complicate efficient detection of available beacons by ATs moving into a coverage area, or exacerbate delays in beacon detection.

SUMMARY

Methods, apparatus and systems for time-shared and concurrent beacon transmission according to one or more transmission protocols (e.g., 1xRTT/DO) in a wireless communication system are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

The proliferation of FAPs and similar lower-power base stations may create challenges for discovery of multi-protocol discovery beacons, for example, 1xRTT and DO beacons. The present technology includes one or more control algorithms used in various methods by a base station in a cellular wireless communications system to control a transmission pattern of discovery beacons, for example, 1xRTT or DO beacons. The transmission pattern enables access terminals using any one of multiple wake-up periods and wake-up offsets to discover all macrocell frequencies in a finite amount of time. In addition, for certain types of base stations, for examples, FAPs, that allocate a single transmit chain to beacons for different protocols, for example, to both 1×RTT and DO beacons, the transmission pattern enables a definite maximum discovery time for multi-protocol beacons such as 1×RTT and DO beacons for all access terminals entering the base station coverage.

In an aspect, the methods may include controlling transmission of a periodic DO beacon for DO wireless transmission by a base station of a wireless communication system to achieve a targeted discovery time 'T', using a first method. The first method may include determining a number 'N' being a non-zero positive integer representing a number of sleep cycles for access terminals served by the base station. The first method may further include determining a non-zero periodicity 'P' such that N and P have a least common multiple that is less than T expressed in number of control channel cycles. The first method may further include periodically transmitting the DO beacon spaced at regular intervals in bursts of signals synchronized to a system control channel cycle, with the signals on each of one or more radio frequencies in each of the bursts determined by a pattern having the periodicity P and covering each possible control channel offset for the access terminals.

In more detailed aspects, the first method may include transmitting successive ones of the bursts at the regular intervals of not less than a least common multiple of P and N. In an alternative, the first method may include transmitting successive ones of the bursts spaced at the regular intervals greater than a least common multiple of P and N that is, in number of control channel cycles, equal to L times N where L is an integer co-prime with M/N where M is greater than N and corresponds to a sleep cycle duration for ones of the access terminals using a long sleep cycle. The regular interval may sometimes be referred to herein as a target worst case DO beacon discovery time, and denoted as $T_{DT,worst}$.

In another aspect, the first method may include transmitting the beacon using the pattern comprising a single transmission for each frequency on any system control channel cycle, and wherein a greatest common divisor of P an N is equal to one. In addition, or in an alternative, the first method may include transmitting the beacon using the pattern comprising transmissions on two consecutive control channel cycles.

In an aspect related to multi-protocol enabled systems, the first method may include transmitting additional bursts of signals configured as a 1×RTT beacon for 1×RTT wireless transmission in between the bursts of signals configured as the DO beacon. In addition, the first method may include patterning the additional bursts of signals as the 1×RTT beacon to have a worst case discovery time for a system of access terminals having N number of sleep cycles of not greater than one of the regular intervals minus a duration of each signal burst in the DO beacon. The duration of each signal burst in the DO beacon may sometimes be referred to as a target fast DO beacon discovery time and denoted as $T_{DO,fast}$.

In another aspect related to multi-protocol enabled systems, the first method may include transmitting the DO beacon triggered by completing a user registration for 1 times Radio Transmission Technology (1×RTT) wireless transmission, in response to a numeric incremental register value indicating a non-zero number of pending DO registrations. In addition, the first method may include using the register to track numbers of pending DO registrations by incrementing and decrementing the register value in offsetting amounts corresponding to respective different events of completing a 1×RTT user registration and completing a DO user registration.

In another aspect, a second method may, in alternative embodiments, be used for controlling transmission of an opportunistic DO beacon by a base station of a wireless communication system. The second method may include maintaining a numeric counter indicating a number of pending DO registrations in a base station memory. The second method may further include triggering initiation of a DO beacon transmission in response to completing a user registration for 1×RTT wireless transmission at the base station at a time when the numeric counter indicates at least one pending DO registration. The base station may avoid maintaining any list or other data structure that tracks currently registered users or access terminals that have registered for 1×RTT or other service with the base station. Instead, the base station may trigger the initiation of the DO beacon transmission solely in response to the numeric counter value when completing the 1×RTT registration.

With respect to the numeric counter, the second method may include indicating a number of pending DO registrations by incrementing and decrementing the counter in offsetting amounts corresponding to respective different events of completing a 1×RTT user registration and completing a DO user registration. In an alternative, or in addition, the second method may include maintaining a numeric counter by maintaining separate counters, a first numeric counter indicating a number of pending DO registrations since the last instance of transmitting the DO beacon for the first duration, and a second numeric counter indicating a number of pending DO registrations since the last instance of transmitting the DO beacon for the second duration minus a current value of the first numeric counter. Other algorithms for maintaining the numeric counter may also be suitable.

In other aspects, the second method may include limiting how often triggering initiation of the DO beacon transmission is performed in response to at least one timer. In addition, or in an alternative, the second method may include transmitting the DO beacon for a first duration at times, and at other times, transmitting the DO beacon for a second duration substantially longer than the first duration. The substantially longer second duration may be, for example, twice as long as the first duration or longer. In another alternative or additional aspect, the second method may include transmitting additional bursts configured as an 1×RTT beacon in between the periodic bursts configured as the DO beacon.

In another aspect, a third method may, in alternative embodiments, be used for transmission of a 1×RTT beacon by a base station of a wireless communication system. The third method may include transmitting 1×RTT discovery bursts for n number of 1×RTT frequencies in corresponding signals, with signals for respective frequencies transmitted one after another in a repeating sequence. The third method may further include transmitting each of the signals for a duration determined by bS+Δ wherein 'b' is an integer, 'S' is less than or equal to a defined number $S_{ALL}$ of all 1×RTT paging slots used for paging 1×RTT receivers, and 'Δ' is an estimated constant delay value greater than zero.

In other, more detailed aspects, the third method may include transmitting the 1×RTT bursts comprising signals for all n frequencies, wherein each of the 1×RTT bursts has a period of n(bS+Δ). In alternative or additional aspects, the third method may include transmitting the 1×RTT bursts for respective frequencies having the duration determined by bS+Δ, wherein S is equal to the defined number $S_{ALL}$ of all 1×RTT paging slots used for paging 1×RTT receivers, wherein each of the 1×RTT bursts has a period of n(b $S_{ALL}$+ Δ). In an alternative, or in addition, the third method may include defining a value for Δ to compensate for a sum of anticipated delays comprising at least one of frequency switching delay at the base station and paging channel decoding delay at an access terminal.

In other, more detailed aspects, the third method may include transmitting the 1×RTT beacon at an increased power level every Nth cycle of the repeating sequence, wherein N is an integer greater than 1. In alternative or additional aspects, the third method may include selecting the integer b equal to two for all signals of the repeating sequence, to accommodate access terminals requiring not more than two consecutive wake-up cycles to trigger idle handoff to the 1×RTT beacon. In further alternative or additional aspects, the third method may include selecting the integer b equal to one for all signals of the repeating sequence, to accommodate access terminals requiring not more than a single wake-up cycle to trigger idle handoff to the 1×RTT beacon.

In further, more detailed aspects, the third method may include transmitting the signals for all n frequencies having the duration determined by bS+Δ, wherein S b, and Δ are such that (bS+Δ) is less than the defined number $S_{ALL}$ of 1×RTT paging slots used for paging 1×RTT receivers and repeating this hopping cycle $N_{f\text{-}per\text{-}cycle}$ number of times. In such embodiments, the third method may further include staggering transmission of beacon bursts after hopping through all n frequencies for $N_{f\text{-}per\text{-}cycle}$ number of times by waiting for a dead time $T_D$ before beginning the next hopping cycle, wherein $T_D$ is calculated to ensure that all 1×RTT paging slots used for paging 1×RTT receivers are covered using a number of the successive hopping cycles not greater than $S_{ALL}/((bS+Δ)*N_{f\text{-}per\text{-}cycle})$ rounded up to the nearest integer. In addition, the third method may further include choosing $N_{f\text{-}per\text{-}cycle}$ equal to a number selected from one or floor[$S_{ALL}/(n(bS+Δ))$]. In another additional aspect, the third method may further include calculating the dead time $T_D$ such that $T_D = T_{D1} + T_{D2}$, wherein $T_{D2} = (bS+Δ)$ and $[nN_{f\text{-}per\text{-}cycle}(bS+Δ)+T_{D1}]$ is an integer multiple of $S_{ALL}$.

In another aspect, a fourth method may, in alternative embodiments, be used for transmission of a 1×RTT beacon by a base station of a wireless communication system. The fourth method may include tracking coverage of a n×$S_{ALL}$ matrix in a memory of the base station provided by 1×RTT discovery bursts, wherein 'n' indicates a total number of 1×RTT frequencies used for communicating to 1×RTT receivers and '$S_{ALL}$' indicates a defined number of all 1×RTT paging slots used for paging 1×RTT receivers in the wireless communication system. The fourth method may further include transmitting, at selected ones of the n frequencies, the 1×RTT discovery bursts each comprising a number 'S' of signal pulses covering less than all of the 1×RTT paging slots at a selected one of the n frequencies. In addition, the fourth method may include selecting the ones of the n frequencies prior to transmitting ones of the 1×RTT discovery bursts so as to maximize an increase in coverage of the n×$S_{ALL}$ matrix provided by each following one of the 1×RTT discovery bursts.

In a more detailed aspect of the fourth method, selecting the ones of the n frequencies may further include determining a subset of the 1×RTT paging slots that can be covered by a next set consisting of S number of signal pulses.

In other more detailed aspects, selecting the ones of the n frequencies may further include, for each ith one of the n frequencies, determining a number '$W_i$' of 1×RTT paging slots not yet indicated as covered in the n×$S_{ALL}$ matrix and that can be covered by a next set consisting of S number of signal pulses. In addition, or in an alternative, selecting the ones of the n frequencies may further include determining a maximum number $W_{max}$ equal to the maximum of $W_i$ over all i, wherein $W_{max}$ occurs at frequency $f_i$.

In another more detailed aspect of the fourth method, tracking coverage of the n×$S_{ALL}$ matrix may include setting entries of the selected frequency $f_i$ for paging slots that will be covered by a next set consisting of S number of signal pulses on this frequency $f_i$ to a predetermined value. Once the entire n×$S_{ALL}$ matrix is covered, all the entries in the matrix may be cleared out and the cycle repeated.

In related aspects, a wireless communications apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as mobile entities or base stations of various types used for wireless communications. Similarly, an article of manufacture may be provided, including a non-transitory computer-readable medium holding encoded instructions, which when executed by a processor, cause a wireless communications apparatus to perform the methods and aspects of the methods as summarized above.

All of the operations of the first, second, third or fourth methods may be performed by a base station or other access point of the wireless communication system, using components as described in more detail elsewhere herein. Although any of these methods may be used to control transmission of 1×RTT and DO discovery beacons, they may also be used to control beacon transmission in systems using other transmission protocols.

Further embodiments, aspects and details of methods, apparatus and systems for time-shared and concurrent multi-protocol (e.g., 1×RTT/DO) beacon transmission in a wireless communication system are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict typical or example embodiments of the technology. These drawings are provided to facilitate the reader's understanding of the technology and shall not be considered limiting of the breadth, scope, or applicability of the technology.

FIGS. 8A, 8B and 8C show further aspects of the method of FIG. 7.

DETAILED DESCRIPTION

Figure 1:
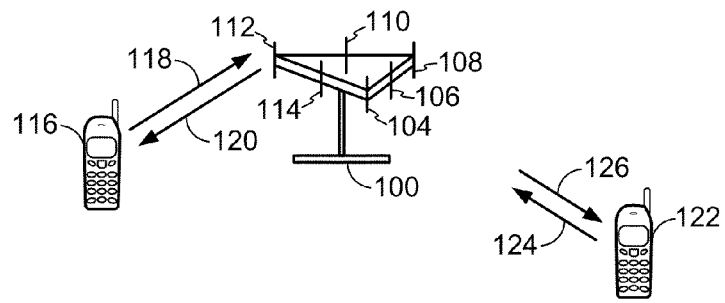
FIG. 1 illustrates a multiple access wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

The techniques described herein may be used for various wireless communication networks such as, for example, Code Division Multiple Access (CDMA) networks, Time Division Multiple Access (TDMA) networks, Frequency Division Multiple Access (FDMA) networks, Orthogonal FDMA (OFDMA) networks, or Single-Carrier FDMA networks. The terms "networks" and "systems" may be used interchangeably herein. A CDMA network may implement a radio technology such as, for example, Universal Terrestrial Radio Access (UTRA), or CDMA2000. UTRA includes Wideband-CDMA (W-CDMA) and Low Chip Rate (LCR). CDMA2000 may encompass radio technologies as described in the IS-2000, IS-95 and IS-856 standards by the $3^{rd}$ Generation Partnership Project 2 (3GPP2). A TDMA network may implement a radio technology such as, for example, Global System for Mobile Communications (GSM). An OFDMA network may implement a radio technology such as, for example, Evolved UTRA (E-UTRA), IEEE 802.11, IEEE 802.16, IEEE 802.20, or Flash-OFDM®. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from the 3GPP2 organization. These various radio technologies and standards are known in the art. In the following description, for reasons of conciseness and clarity, terminology associated with W-CDMA and LTE standards, as promulgated under the 3GPP standards by the International Telecommunication Union (ITU), is used. It should be emphasized that the techniques described herein may also be applicable to other technologies, for example the technologies and standards mentioned above.

Single-Carrier Frequency Division Multiple Access (SC-FDMA), which utilizes single carrier modulation and frequency domain equalization, has similar performance and essentially the same overall complexity as those of OFDMA systems. An SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. SC-FDMA is used for uplink multiple access in 3GPP LTE, or Evolved UTRA.

Referring to FIG. 1, a multiple access wireless communication system according to one embodiment is illustrated. An access point 100 (e.g., base station, evolved NodeB (eNB), or the like) includes multiple antenna groups, one including 104 and 106, another including 108 and 110, and an additional one including 112 and 114. In FIG. 1, two antennas are shown for each antenna group, however, more or fewer antennas may be utilized for each antenna group. A mobile entity (ME) 116 is in communication with the antennas 112 and 114, where the antennas 112 and 114 transmit information to the mobile entity 116 over a forward link 120 and receive information from the mobile entity 116 over a reverse link 118. A mobile entity 122 is in communication with the antennas 104 and 106, where the antennas 104 and 106 transmit information to the mobile entity 122 over a forward link 126 and receive information from the mobile entity 122 over a reverse link 124. In a Frequency Division Duplex (FDD) system, the communication links 118, 120, 124 and 126 may use different frequencies for communication. For example, the forward link 120 may use a different frequency than that used by the reverse link 118.

Each group of antennas and/or the area in which they are designed to communicate is often referred to as a sector of the access point. In certain embodiments, antenna groups each are designed to communicate with mobile entities in a sector, of the areas covered by the access point 100.

In communication over the forward links 120 and 126, the transmitting antennas of the access point 100 may utilize beamforming in order to improve the signal-to-noise ratio of forward links for the different mobile entities 116 and 122. Also, an access point using beamforming to transmit to mobile entities scattered randomly through its coverage causes less interference to mobile entities in neighboring cells than an access point transmitting through a single antenna to all its mobile entities.

An access point may be a fixed station used for communicating with the terminals and may also be referred to as a base station, a NodeB, an eNB, a Home Node B, a femto base station or femto access point, or some other terminology. A mobile entity may also be referred to as an access terminal (AT), a user equipment (UE), a mobile station, a wireless communication device, terminal, or the like.

Figure 2:
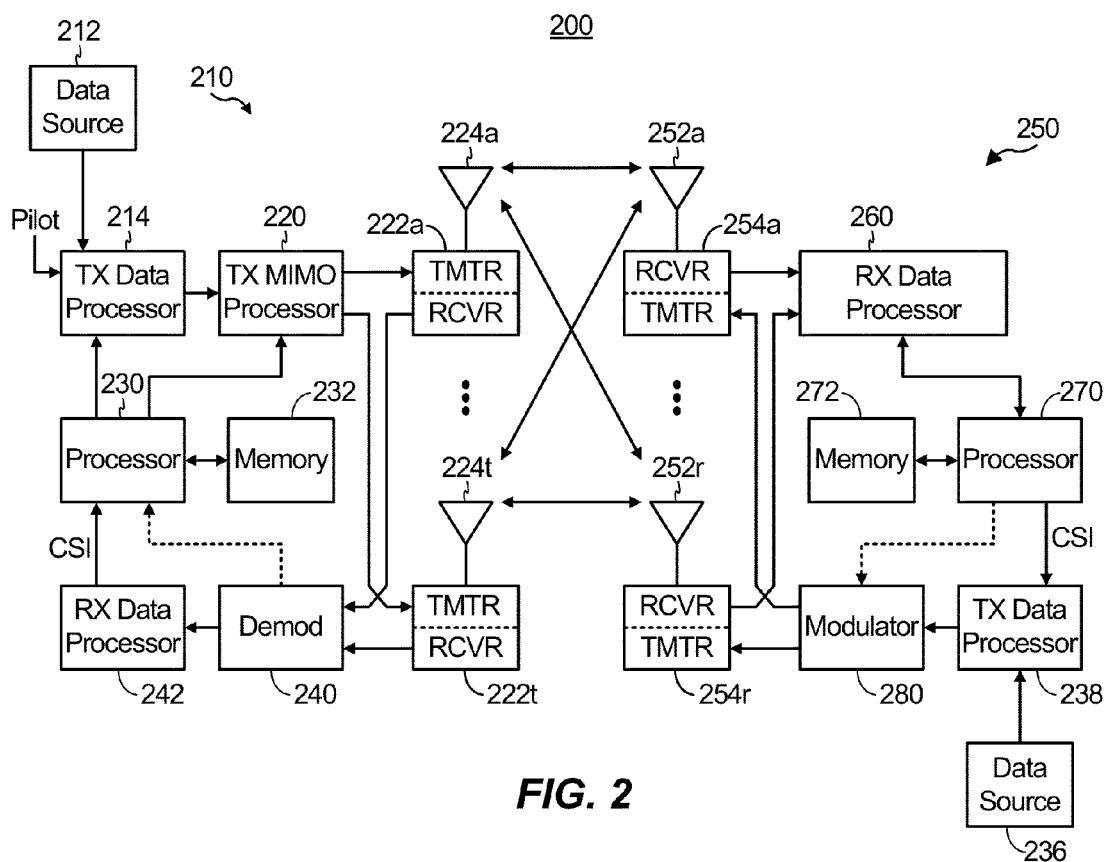
FIG. 2 illustrates a block diagram of a communication system.

FIG. 2 is a block diagram of an embodiment of a transmitter system 210 (also known as an access point) and a receiver system 250 (also known as a mobile entity) in a MIMO system 200. At the transmitter system 210, traffic data for a number of data streams may be provided from a data source 212 to a transmit (TX) data processor 214.

In an embodiment, each data stream may be transmitted over a respective transmit antenna. The TX data processor 214 may format, code, and interleave the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream may then be modulated (i.e., symbol mapped) based on a particular modulation scheme (e.g., Binary Phase Shift Keying (BPSK), Quadrature Phase Shift Keying (QSPK), M-ary Phase-Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 230, which may be in operative communication with a memory 232. The memory 232 may hold program instructions, that when executed by the processor 230 (by itself or in cooperation with other processors of the access point), cause the access point 210 perform a methodology as disclosed herein to control transmission of a discovery beacon from the transmitters 222a-222t.

The modulation symbols for the data streams may be provided to a TX MIMO processor 220, which may further process the modulation symbols (e.g., for OFDM). The TX MIMO processor 220 may then provide $N_T$ modulation symbol streams to $N_T$ transmitters (TMTR) 222a through 222t. In certain embodiments, the TX MIMO processor 220 may apply beamforming weights to the symbols of the data streams and to the antenna from which the symbol is being transmitted.

Each transmitter 222a-222t may receive and processe a respective symbol stream to provide one or more analog signals, and further may condition (e.g., amplify, filter, and upconvert) the analog signals to provide a modulated signal suitable for transmission over the MIMO channel. $N_T$ modulated signals from the transmitters 222a through 222t may then be transmitted from $N_T$ antennas 224a through 224t, respectively.

At the receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filter, amplifie, and downconvert) a respective received signal, digitize the conditioned signal to provide samples, and further process the samples to provide a corresponding "received" symbol stream.

A RX data processor 260 may then receive and process the $N_R$ received symbol streams from the $N_R$ receivers 254 based on a particular receiver processing technique to provide $N_T$ "detected" symbol streams. The RX data processor 260 may then demodulate, deinterleave, and decode each detected symbol stream to recover the traffic data for the data stream. The processing by the RX data processor 260 may be complementary to that performed by the TX MIMO processor 220 and the TX data processor 214 at the transmitter system 210.

A processor 270 may periodically determine which pre-coding matrix to use. The processor 270 may formulate a reverse link message comprising a matrix index portion and a rank value portion, and may be in operative communication with a memory 272.

The reverse link message may comprise various types of information regarding the communication link and/or the received data stream. The reverse link message may then be processed by a TX data processor 238, which also may receive traffic data for a number of data streams from a data source 236, modulated by a modulator 280, conditioned by the transmitters 254a through 254r, and transmitted back to the transmitter system 210.

At the transmitter system 210, the modulated signals from the receiver system 250 may be received by the antennas 224, conditioned by the receivers 222, demodulated by a demodulator 240, and processed by a RX data processor 242 to extract the reserve link message transmitted by the receiver system 250. The processor 230 may then determine which pre-coding matrix to use for determining the beamforming weights then processes the extracted message.

Figure 3:
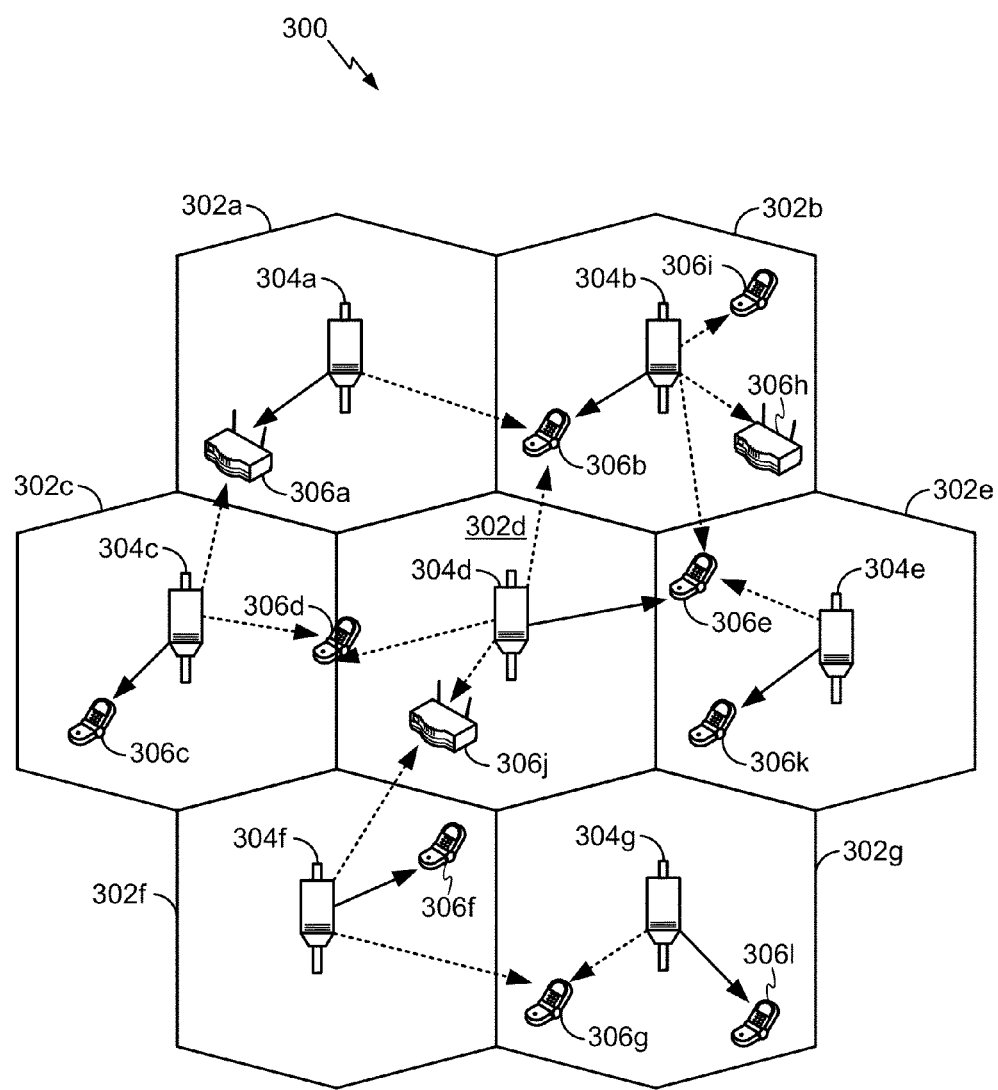
FIG. 3 illustrates a wireless communication system configured to support a number of users.

FIG. 3 illustrates a cellular wireless communication system 300, configured to support a number of users, in which the teachings herein may be implemented. The system 300 may provide communication for multiple cells 302, such as, for example, macro cells 302a-302g, with each cell being serviced by a corresponding access node 304 (e.g., access nodes 304a-304g). An access node may sometimes be called an e-Node B (eNB) or more generally, a Node B. As shown in FIG. 3, mobile entities 306 (e.g., mobile entities 306a-306l) may be dispersed at various locations and move throughout the system 300 over time. Each mobile entity 306 may communicate with one or more access nodes 304 on a forward link ("FL") and/or a reverse link ("RL") at a given moment, depending upon whether the mobile entity 306 is active and whether it is in soft handoff (if applicable), for example. The wireless communication system 300 may provide service over a large geographic region. For example, macro cells 302a-302g may cover a few blocks in an urban or suburban neighborhood or a few square miles in a rural environment.

In accordance with aspects of the embodiments described herein, a mobile entity can report measurements of the last serving cell and/or neighbor cells in one or more networks, such as, for example, LTE, UTRAN, GSM EDGE (Enhanced Data rates for GSM Evolution) Radio Access Network (GE-RAN), and/or CDMA2000 networks. The reported measurements may be used by the network to collect information regarding radio link failures (RLFs) to optimize the deployment and tuning of the network. It is again noted that, while terminology associated with LTE standards, as promulgated under the 3GPP standards, is used herein, the techniques described herein may be applicable to other technologies and standards.

Figure 4:
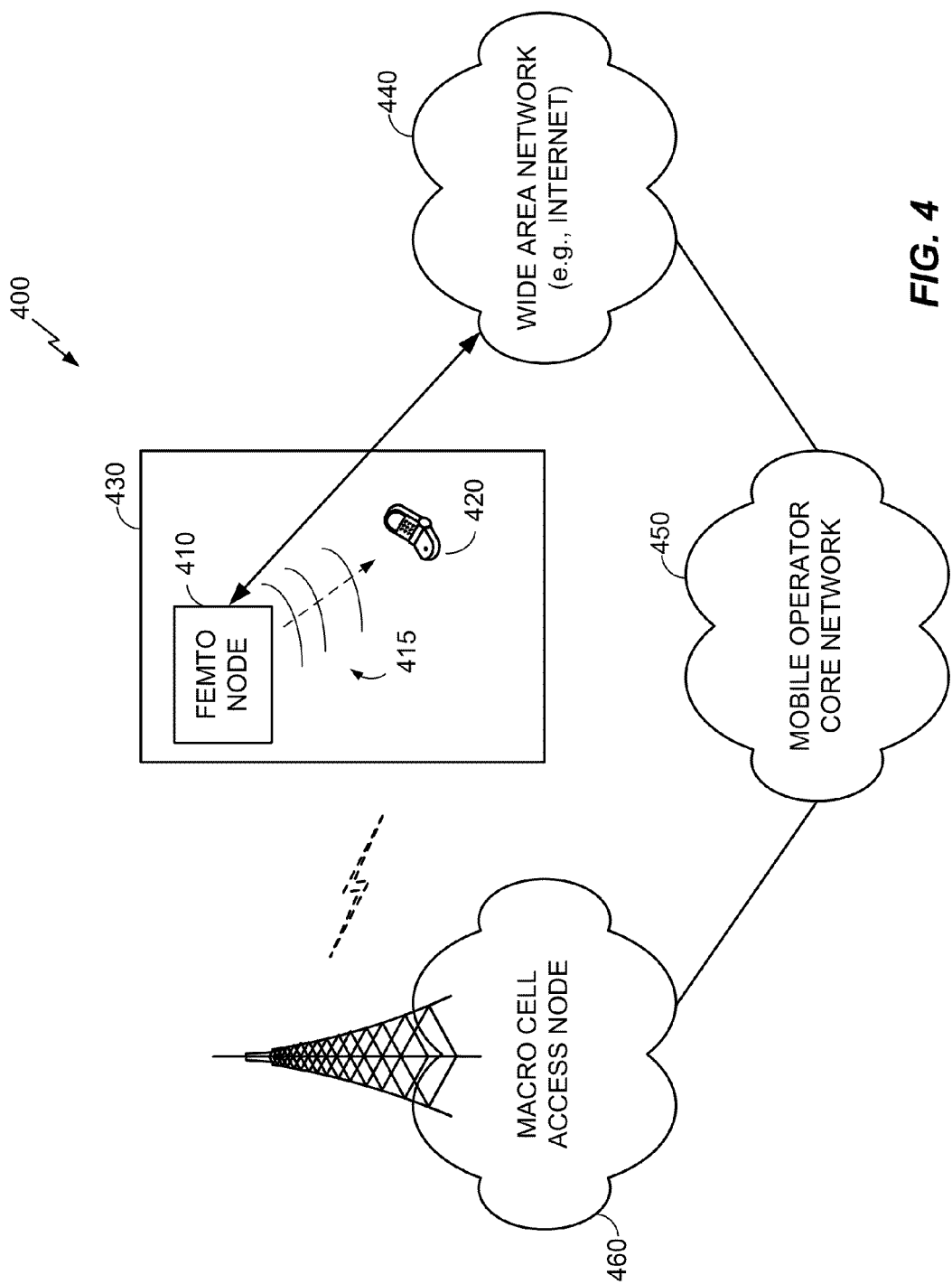
FIG. 4 illustrates an exemplary communication system to enable deployment of femto nodes within a network environment.

FIG. 4 illustrates an exemplary communication system 400 where one or more femto nodes, sometimes called Home Node B's (HNB's), are deployed within a network environment. Specifically, the system 400 includes one or more multiple femto nodes 410 installed in a relatively small scale network environment (e.g., in one or more user residences 430 or business). Each femto node 410 may be coupled to a wide area network 440 (e.g., the Internet) and a mobile operator core network 450 via a DSL router, a cable modem, a wireless link, or other connectivity means (not shown). Each femto node 410 may be configured to serve an associated mobile entity 420 and, more generally, some plural number of mobile entities within radio range. In some applications, access to femto node(s) 410 may be restricted whereby a given mobile entity 420 may be served by a set of designated (e.g., home) femto nodes but may not be served by any non-designated femto nodes (e.g., a neighbor's femto node).

Beacons have been proposed for use in 1 times Radio Transmission Technology (1×RTT or "1×") and Evolution Data Optimized (EV-DO or DO) femtocell deployments to assist mobiles in finding femto Base Stations (BS), e.g., node 410. When multiple carriers are available in the macro network 450, the mobile may be in idle mode on one of these carriers for both 1×RTT and DO. However, once an AT 420 comes within range of an associated femtocell, signaling should be provided to allow the AT to detect the femto BS and redirect to the femtocell frequency on 1×RTT as well as DO. To achieve this, a femto BS may radiate a beacon 415 on 1×RTT and DO macro frequencies, which in 1×RTT, consists of pilot, synchronization and paging channels, and in DO consists of standard EV-DO pilot, Media Access Control (MAC) layer bursts and the Control Channel (CC). In 1x-RTT, the paging channel overhead messages may redirect the idle-mode mobile onto the femtocell's 1xRTT frequency. In DO, this function may be performed by the CC overhead messages to redirect the idle-mode mobile onto the femtocell's EV-DO frequency.

Beacons have potential to interfere with the macro network, e.g., at macro access node 460. In order to limit this interference, the beacon 415 may be operated in an infrequent periodic manner. However, to capture the users quickly, the beacon may also be transmitted in an 'opportunistic' way, where its transmission is triggered by an indication of the arrival of an AT to the femto coverage area such as 1xRTT user registration or out-of-band user discovery. The 1xRTT registration indicates presence of a potential DO handset in the vicinity, which the opportunistic beacon exploits to capture the AT quickly without causing significant interference to the macro network.

The beacon 415 should be able to discover ATs on all macro frequencies with all wake-up periods and wake-up offsets in a finite amount of time. The beacon scheduler should ensure that scheduling patterns used for transmitting the beacon satisfies this constraint.

Moreover, due to hardware limitations, HNBs or other base stations may be limited to a single transmit chain allocated to 1xRTT and DO beacons. A transmit chain may refer to a hardware assembly enabling radio transmission, including amplifiers, etc., for example as provided in an integrated circuit or the like. The transmit chain therefore may need to be shared by both 1xRTT and DO to transmit beacons across multiple macro carriers, effectively reducing resources available for discovery beacons. A 1xRTT and DO beacon shared transmission scheme should therefore be efficiently designed to ensure a finite targeted discovery time for both 1xRTT and DO for all ATs entering the femtocell coverage.

In addition, idle mobile ATs may be configured with different wakeup periods. For example, in DO, idle mobile ATs may wake-up every 12 CC cycles or 96 CC cycles, with applicable random wakeup cycle offsets in the range of 0-11 and 0-95 from the baseline zero$^{th}$ cycle, respectively. ATs with a wakeup period of 96 CC cycles (40.96 s) may be denoted as long sleep (LS) users. Variability in wakeup periods and offsets imposes another requirement on the DO beacon design, which should be able to discovery all mobiles with these wakeup periods and offsets. Similarly, if in a 1xRTT network, idle mobiles wake-up with different periodicity, then beacon transmission should ensure discovery for all these mobile ATs also.

Embodiments described herein therefore present techniques for use in 1xRTT and EV-DO femtocell deployments to assist mobile access terminals in finding base stations, for example HNBs, using various specific scheduling patterns generated by different algorithms. Although examples and terminology associated with the 3GPP2 standards are used herein, the techniques described herein may be implemented using other technologies and standards. Several different approaches are described in detail below. These approaches may be used individually, or in any operable combination for design and implementation of beacon transmissions from HNBs and other base stations. Time shared 1x/DO beacons represent a useful but not exclusive application. Various beacon scheduling methods and patterns are described in turn.

A DO beacon may be transmitted in two modes: Periodic mode and opportunistic mode. As used herein, opportunistic mode refers only to DO beacons and not to 1xRTT beacons. Various periodic 1xRTT beacon designs are also described. As used herein, "periodic" does not necessarily imply absolutely regular periodicity; for example, a repeating periodic cycle may include an irregular delay or lag between cycles or other variations as described between successive cycles.

Figure 5:
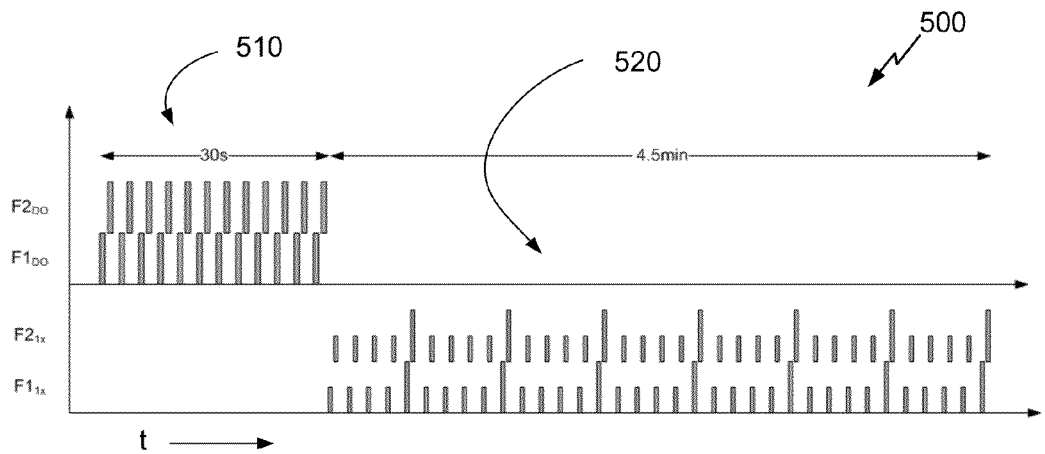
FIG. 5 illustrates an example of a time-shared and concurrent 1×/DO beacon.

FIG. 5 shows an example of a time-shared beacon scheduling pattern 500 (default periodic mode only) for a targeted maximum discovery time of 5 minutes for 1xRTT and DO. The upper two lines 510 depict a DO transmission burst for two frequencies, while the lower two lines 520 depict a 1xRTT transmission burst for the two frequencies. A target fast discovery time $T_{DO,fast}$ may equal, for example, about 30 s, equal to the duration of the signal burst 510, while a target worst discovery time $T_{DT,worst}$ may equal 5 minutes approximately. Opportunistic mode is not shown. The DO transmission burst includes 12 signals at each of the two frequencies, according to a periodicity that may be determined as described more particularly herein. The signal configuration of the burst 510 may sometimes be referred to herein as a pattern or beacon pattern.

Figure 6:
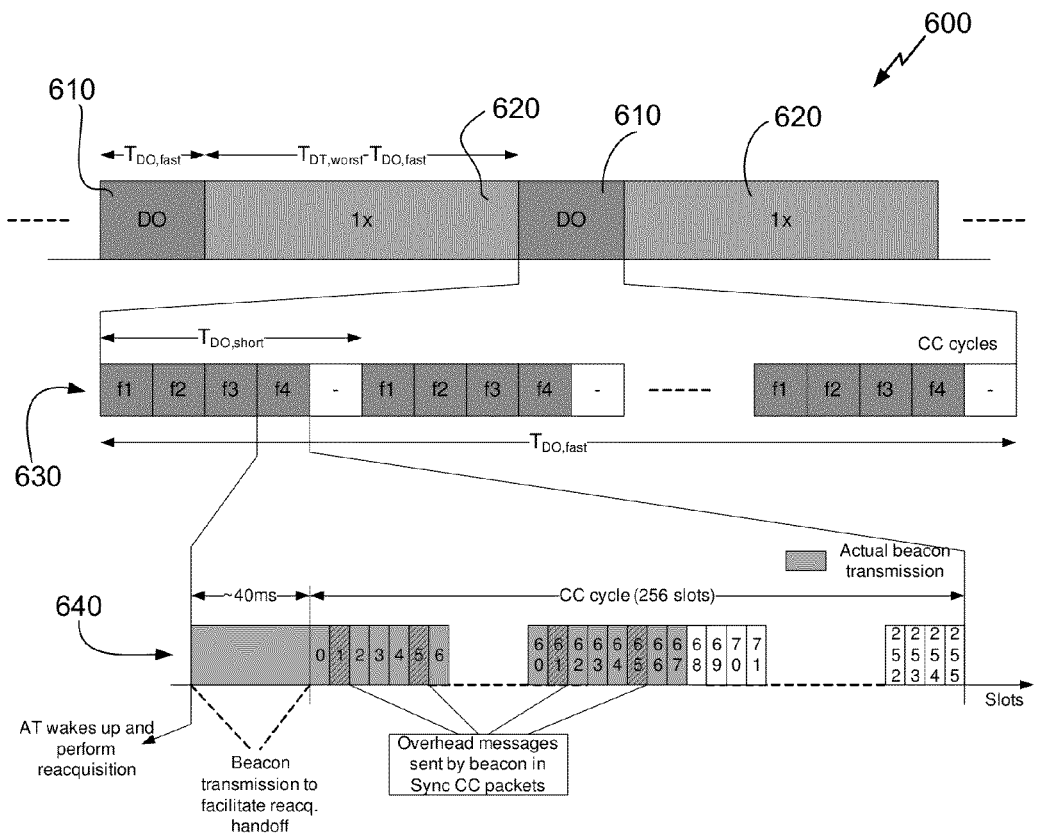
FIG. 6 illustrates a further example and additional aspects of a time-shared and concurrent 1×/DO beacon.

FIG. 6 shows another representation of time-shared 1x/DO beacon design 600 (default periodic mode only) for 4 DO macro frequencies, comprising interleaved bursts 610, 620 of DO and 1xRTT beacon transmissions, respectively, spaced at regular intervals. The middle diagram 630 shows transmission of the DO burst 610 in different CC cycles. In this example, the targeted DO short or minimum discovery time $T_{DO,short}$ is chosen to be 5 CC cycles since it is co-prime with 12, which is the number of DO short sleep cycles (12 offsets). White blanks can also be used for 1xRTT beacon transmission. Opportunistic mode is not shown. The lowest diagram 630 shows the slots in which the actual transmission may take place with respect to the CC cycle boundary.

DO Periodic Mode

A general method for designing a DO beacon pattern should be able to cover all control channel wakeup offsets on all specified macro frequencies within a targeted discovery time. A control channel offset count of 12 with a targeted short discovery time of 5 CC cycles represents a special case. The operations described below may be used for beacon design in the general case.

For initial operations, assuming a targeted discovery time of $T_{DO,fast}$, the targeted discovery time may be expressed in control channel cycles herein designated $N_{DO,fast}$ wherein 'N' is the number of sleep cycles or wake-up periods in expressed in units of control channel (CC) cycles, for ATs within the applicable communications system. For example, $N_{DO,fast}$ may be equal to 12. A base station may determine a beacon periodicity, as follows. The base station may select a periodicity value 'P' (expressed in CC cycles) such that LCM(N,P) <$N_{DO,fast}$, wherein LCM stands for least common multiple. In the method being discussed, the discovery time will turn out to be LCM(N,P). P becomes the periodicity of the pattern, i.e. the pattern repeats every P CC cycles. The pattern will need to be repeated at least LCM(N,P)/P times to cover all CC cycles on all frequencies.

Next, the base station may determine how to distribute transmissions on different frequencies and control channel cycles within the period P, as follows:
 1. Determine D=GCD(N,P), where GCD is greatest common divisor of N and P.
 2. If D==1, N and P are co-prime, by definition. In this special case, the base station may configure the beacon pattern simply as a single transmission for each frequency on any of the CC cycles in the pattern of period P.
 3. If D is not equal to 1, the base station may configure the beacon pattern as follows. Efficient beacon design should endeavor to use a minimum number of transmissions. The base station may determine a set of CC cycles $c_0, c_1, c_2, \ldots, c_{D-1}$ that satisfy the condition $c_k \mod D=k$, for all k, wherein transmissions on frequency f1 occur on CC cycles $c_0, c_1, c_2, \ldots, c_{D-1}$, CC cycle counting within the pattern starts from 0, and a minimum of D CC cycles are used for beacon transmissions on each frequency. Determining the set of CC cycles may be repeated for each frequency, and the base station may pick non-overlapping CC cycles for transmission on each frequency. Basically, the pattern should cover offsets $0, 1, \ldots, D-1$ with respect to D. A simple way to do this is by setting $c_k=k$, but a disadvantage with this simple approach is that transmissions on a particular frequency are bunched together. By spacing out transmissions on each particular frequency, interference with a macro network on a particular frequency may be avoided for a longer periods.

4. If the periodicity P is such that not all frequencies can be fitted without overlap for any combination of $c_0, c_1, c_2, \ldots, c_{D-1}$, the base station may select a larger value of P.

The above algorithm may be effective for the limited case wherein a single beacon transmission on a CC cycle is required to redirect a user waking up on that CC cycle. Under certain conditions this is not true. Instead, for some ATs, two consecutive CC transmissions are required to redirect a user. For example, if an AT wakes up at CC cycle m, the beacon transmission needs to be ON for CC cycle m and m+1 to trigger redirection to the new cell. The above design may be extended to cover this case by putting transmissions for each $c_k$ as well as $c_k+1$ on the same frequency. Here, some clumped-together combinations might be better as they require lower number of transmissions. This is because $c_k+1$ might correspond to some other $c_n$.

Certain examples of the foregoing methodology are set forth below:

Example 1

A beacon pattern for one frequency (f1) with worst case discovery time of <16 seconds. Therefore $N_{DO,fast}$=37.5 CC cycles. Let N=12 CC cycles.
 a. Selecting P=9, LCM(9,12)=36 which is <37.5.
 b. D=GCD(9,12)=3. Thus, $c_0, c_1, c_2$ are selected such that $c_k \mod 3=k$. One can pick $c_0=0, c_1=1, c_2=2$ for f1. The pattern becomes <1,1,1,0,0,0,0,0,0>. In this notation, each entry corresponds to the frequency for which the transmission is done in that CC cycle. So, frequency f1 for $0^{th}$ CC cycle to $2^{nd}$ CC cycle, and no transmission for $3^{th}$ through $8^{th}$ CC cycles. Another alternative is $c_0=0, c_1=7, c_2=2$ for f1. The pattern becomes <1,0,1,0,0,0,0,1,0>. The selected pattern is then repeated for a minimum of 4 times. Note that CC cycle counting starts from 0 here.
 c. In a design for ATs requiring two consecutive CC cycles for wakeup, as mentioned above, the first pattern may be changed to <1,1,1,1,0,0,0,0,0>, and the second pattern can be changed to <1,1,1,1,0,0,0,1,1>. However, the first pattern is more beneficial since it has less transmission for the same discovery time.

Example 2

A beacon design pattern for two frequencies (f1, f2) with worst case discovery time of <16 seconds. $N_{DO,fast}$=37.5 CC cycles. Let N=12 CC cycles.
 a. Selecting P=9, LCM(9,12)=36 which is <37.5.
 b. D=GCD(9,12)=3. Thus $c_0, c_1, c_2$ are selected such that $c_k \mod 3=k$. One can pick $c_0=0, c_1=1, c_2=2$ for f1 and $c_0=6$, $c_1=7, c_2=5$ for f2. The pattern becomes <1,1,1,0,0,2,2,2,0>. Again, each entry corresponds to the frequency for which the transmission is done in that CC cycle. So, frequency f1 for $0^{th}$ to $2^{nd}$ CC cycle, f2 for $5^{th}$ to 7th CC cycle, and no transmission for $3^{rd}$, $4^{th}$ and $8^{th}$ CC cycles. Another alternative is $c_0=0, c_1=7, c_2=2$ for f1 and $c_0=3$, $c_1=1, c_2=5$ for f2. The pattern becomes <1,2,1,2,0,2,0,1,0>. Note that this latter pattern may be more beneficial since it only interferes with macro control channel in shorter bursts. Either pattern must then be repeated for a minimum of 4 times.
 c. In a design for two consecutive CC cycle wakeup requirement, as mentioned above, the first pattern from Example 2 at step b can be changed to <1,1,1,1,0,2,2,2,2>. The second pattern from step 2b cannot be extended since the fields become overlapping.

Example 3

A beacon pattern for 2 frequencies (f1, f2) with worst case discovery time of <30 seconds. $N_{DO,fast}$=70.3 CC cycles. Let N=12 CC cycles.
 a. Selecting P=5, LCM(5,12)=60 which is <70.3.
 b. GCD(5,12)=1. Thus, 5 and 12 are co-prime. The pattern may simply be <1,2,0,0,0>. Again, each entry corresponds to the frequency for which the transmission is done in that CC cycle. So, frequency f1 for $0^{th}$ CC cycle, f2 for $1^{st}$ CC cycle, no transmission for $2^{nd}$, $3^{rd}$ and $4^{th}$ CC cycles. This pattern is then repeated for a minimum of 12 times. Some other possible patterns are <1,0,2,0,0>, <0,1,0,0,2>. They are all equivalent.
 c. For ATs requiring two consecutive CC wakeup cycles, as mentioned above, the pattern may be changed to <1,1,2,2,0> or <1,1,0,2,2> or something equivalent.

For the 1×RTT beacon that is timeshared with a periodic DO beacon, the 1×RTT beacon may be designed with a worst case discovery time $T_{1\times,WT} \leq T_{DT,worst} - T_{DO,fast}$. 1×RTT beacon design may be as described in U.S. patent application Ser. No. 12/542,294, and/or as described later herein. The shared-design may comprise a concatenation of the two patterns. For example, the base station may transmit the DO pattern for $T_{DO,fast}$ duration. After this, it may transmit the 1×RTT pattern for $T_{DT,worst} - T_{DO,fast}$ duration. If 1×RTT worst case discovery time is $< T_{DT,worst} - T_{DO,fast}$ a sleep time may be introduced between end of 1×RTT transmission and start of DO transmission such that the total period of 1×RTT plus DO beacon transmissions is $T_{DT,worst}$, an odd multiple of a certain number of DO CC cycles (e.g., 12). This concatenated pattern/waveform is then repeated. One motivation behind using an odd multiple of 12 CC cycles is that long sleep ATs with a wake up period of 96 CC cycles are covered in exactly 8 transmissions of the basic DO beacon pattern. Assuming that the DO beacon pattern is optimized as defined in Example 1c, this is the most efficient beacon pattern achievable for LS users, i.e. each wake offset of 0-95 on each frequency is covered only once. The worst case discovery time for the LS users may be $8*T_{DT,worst}$.

Moreover, DO periodic mode can be extended for wakeup period shorter than 96 CC cycles as well. All wake-up periods that are less than 12 CC cycles are automatically covered in a single DO beacon pattern. Other possible wake-up periods that are greater than 12 CC cycles are ~24, 48 which are second and fourth multiples of 12. With the beacon design of 1, the worst case discovery time for 24 and 48 CC cycles wakeup mobiles may be $2*T_{DT,worst}$ and $4*T_{DT,worst}$.

An alternative way to derive the design requirements is by defining the worst case discovery time for LS users instead (or for 24 or 48 CC cycles wakeup period). Let this be $T_{DT,LS}$. $T_{DT}$ may then be derived as $T_{DT}=T_{DT,LS}/8$.

If the DO beacon pattern is such that there are gaps between two successive transmissions, a 1×RTT beacon may be transmitted during this gap. If the hardware allows simultaneous 1×RTT and DO beacon transmissions, the discovery times for 1×RTT and DO may be improved since 1×RTT and DO can be sent concurrently and can operate independently. The DO beacon may be designed by as described above, and setting $T_{DO,fast}=T_{DT,worst}$. 1×RTT beacon design may use $T_{DO,fast}=0$.

DO Opportunistic Mode

In addition to periodic mode, the DO beacon may be also transmitted in an opportunistic mode in order to improve the discovery time characteristics of DO mobiles. In an opportunistic mode, the beacon may be triggered by 1×RTT user registrations on the femtocell, and may be given higher priority for transmission than 1×RTT beacon transmission. The opportunistic mode may be transmitted in a) regular opportunistic mode or b) extended opportunistic mode. Regular opportunistic mode may be transmitted for a shorter duration and may be intended to capture users waking up every 5.12 seconds or so. Extended opportunistic mode may be transmitted for a longer duration and may be intended to capture users waking up every 40.96 s or so. The rates at which regular opportunistic or extended opportunistic is triggered may be controlled using timers to limit the interference to DO macro network and impact on 1×RTT beacon discovery performance. The pattern for extended opportunistic beacon transmission may be the same as regular opportunistic beacon but the extended opportunistic pattern may be transmitted for a longer time to ensure discovery of LS users.

In comparison to the opportunistic beacon as described in WIPO Publication No. WO 2010/025348 A1 for triggering DO beacon if there are an unequal number of 1×RTT and DO users, the present design provides certain advantages. First, the present proposed design provides a layered scheduling scheme, wherein a combination of a short concentrated periodic burst and a regular opportunistic beacon ensure discovery for regular wake-up users (i.e. users waking up every 5.12 s). Thus, the long-sleep users may also be guaranteed discovery in an efficient manner by ensuring that the default periodic beacon covers these users as well, and also transmitting an extended opportunistic beacon for any pending users. In comparison, the beacon schedule in the mentioned WIPO publication doesn't obey any fixed timeline with respect to the CC cycle and doesn't have a layered scheduling structure, and so needs to transmit the beacon on a particular frequency for 40 seconds continuously to cover long-sleep users. This can lead to significant impact to the macro network.

Another advantage that may be provided by the present design is that different discovery times for the default periodic mode beacon and the opportunistic beacon may be targeted by adjusting the relevant parameters. In addition, the present design may be computationally more efficient since it does not require any registration tables to keep track of which 1×RTT and which DO users are currently registered and physically present on the femtocell, as is done in the indicated publication. Such maintenance also requires periodic registrations from 1×RTT and DO users, which leads to signaling load. Instead, the present design uses temporary counters that track 1×RTT registrations since the last regular opportunistic or extended opportunistic beacon.

1×-RTT Beacon Designs

As mentioned above, 1×RTT beacon design may be as described in U.S. patent application Ser. No. 12/542,294, describing 1×RTT layered beacons. Some other designs for 1×RTT beacon are described in the section below.

1×RTT Example 1

Some mobile entities may require a 1×RTT beacon to be detected with good signal strength more than once in order to perform idle handoff to beacon. For example, detection over N consecutive paging channel slots or paging channel slot cycles (i.e., consecutive wake-ups), may be required. To service such equipment, the 1×RTT beacon may be transmitted over N consecutive slots or slot cycles, as needed. This increases the overall beacon discovery (i.e., detection) time, but ensures good discovery performance. An example of an algorithm for determining a transmission patter wherein beacons are transmitted such that a mobile detects them in two consecutive wake-ups is described below.

In the following description, 'S' denotes the paging channel (PCH) slot cycle length for example expressed in number of PCH slots, e.g. 64 slots corresponding to 5.12 s wake-up. The symbol 'N1×' denotes the number of 1×RTT beacon frequencies. The base station may transmit the beacon on each frequency in a round robin manner with a dwell time (also known as beacon transmit duration (BTD))=[2*S+Delta] slots. Here, the factor 2*S provides that the beacon will cover two successive slot cycles. An additional 'Delta' slot of transmission may be used to account for factors such as frequency switching delay, PCH overhead message decoding delay at the mobile, or need to begin transmission some time prior to the slot boundary (e.g. 40 ms prior to PCH slot boundary), because an idle mobile typically begins searching other pilots some time prior to the slot boundary. Thus, though the total transmission duration is BTD, the useful duration (i.e., the beacon transmission that actually triggers idle handoff) may be less than BTD. This inefficiency is compensated for by additional 'Delta' slots of transmission rather than just transmission of 2*S slots.

The above algorithm may ensure that a mobile waking up in any PCH slot on any frequency detects beacon and performs idle handoff to it with a maximum delay of N1×*[2*S+Delta] PCH slots. For example, if S=64 PCH slots (i.e., 5.12 s wake-up), N1×=4, Delta=4 PCH slots, the worst case beacon discovery time is 528 PCH slots (i.e., 42.24 s). The quantity N1×*[2*S+Delta] may be regarded as the total period of the beacon waveform. Once all frequencies are hopped through in round robin manner, beacon transmission may be started again from the starting frequency and thus the cycle may repeat itself with periodicity of N1×*[2*S+Delta] PCH slots.

In addition, the above design can be combined with elements of algorithms as disclosed in U.S. patent application Ser. No. 12/542,294. For example, beacons may be transmitted with low and high power levels to provide good trade-off between beacon discovery vs. interference created by beacon transmission. For example, beacons can be transmitted with high power every Nth cycle of the above waveform.

1×RTT Example 2: If mobile entities do not require the beacon to be detected in two consecutive wake-up cycles in order to perform idle handoff to beacon, then the algorithm provided in "Example 1" may be modified by choosing BTD=(S+Delta) slots. This provides a worst case beacon discovery time of N1×*[S+Delta] PCH slots.

1×RTT Example 3

The designs described in 1×RTT Examples 1 and 2 assume BTD>S. Often, a short BTD is desired to minimize beacon interference. In such a case, the base station may transmit beacons on N1× frequencies in round-robin manner with a dwell time of BTD on each frequency. The base station may set the Tsemi-period=BTD*N1× (PCH slots) as the period of this hopping waveform. The waveform may be repeated provided the pattern is configured to ensure that in the next cycle the 1×RTT beacon is transmitted on PCH slots other than those in the previous cycle to ensure all slots in the slot cycle of length S PCH slots can be covered with beacon transmission. Thus, successive cycles of the beacon waveform should be properly staggered.

The base station may achieve such staggering as follows. After transmitting beacon on different frequencies, the base station may insert a dead time (no transmission) denoted here by "Tdead1" slots such that Tsemi-period=(BTD*N1×+Tdead1) is a multiple of S. Then, the base station may introduce additional dead time Tdead2=BTD slots such that Tperiod=(BTD*N1×+Tdead1+Tdead2). Thus, after transmitting in round-robin manner for Tsemi-period slots and insertion of appropriate dead time, the base station may repeat the beacon waveform. The resulting overall periodicity may be Tperiod. Several such waveforms are possible with suitable selection of BTD and the dead times. In general, the insertion of dead time in this manner may not provide minimal discovery time.

1×RTT PCH Signaling

In addition to scheduling physical transmission of beacons, proper scheduling of PCH signaling messages within each beacon burst may be used to enable efficient re-direction. For PCH signaling message scheduling the base station may use the following algorithm:

In contrast to regular femtocell's PCH channel, the base station may transmit only messages essential for re-direction on beacon's PCH channel to achieve efficient packing of these messages within the beacon burst. Typically, the PCH channel carries several messages, but not all of them are necessary for re-directing a mobile to femtocell frequency. For example, the Neighbor List Message should not be transmitted or transmitted with empty fields.

The base station may determine the number of PCH slots required to transmit all the essential messages (denoted by say M1, M2, . . . , Mx) while ensuring that each PCH slot's bits are utilized to the fullest. For example let this number be $N_{pch-msgs-slots}$. Typically, $N_{pch-msgs-slots}$=1 or 2.

If $N_{pch-msgs-slots}$=1 (all messages fit in one slot), then the base station may simply transmit all messages in each of the slot within the BTD.

If $N_{pch-msgs-slots}$=2 (say, out of 5 messages M1 to M3 fit in one PCH slot and M4 and M5 fit in other PCH slot), then the base station may transmit all these messages in blocks of 2 PCH slots, i.e., transmit M1 to M3 in every odd slot and M4 to M5 in every even slot.

It should be apparent that other scheduling strategies for PCH signaling may also be suitable.

"Greedy" Algorithm

In general, designing a beacon waveform analytically for any arbitrary BTD and number of frequencies is not an easily tractable problem and may result in sub-optimal waveforms in terms of beacon discovery time. Alternatively, beacon waveform can be designed using a computer search based on a "greedy" algorithm that tries to utilize every possible transmission opportunity to cover some previously uncovered slots. This reduces insertion of dead times and therefore can improve performance. An outline of such a "greedy" algorithm is provided below. For purposes of the example below, it may be assumed that mobile needs to detect beacon only in one slot cycle to perform handoff to the base station transmitting the beacon.

The following symbology is used in the example of a "greedy" algorithm:

N1×=Number of 1×RTT beacon frequencies

U=Number of useful slots out of BTD slots when beacon burst is transmitted on a particular frequency. (As explained earlier not all slots within BTD may be useful for triggering idle HO).

S=Number of slots in the paging slot cycle.

$t_s$=PCH slot index; $0 < t_s < (S-1)$.

t=Time in units of PCH slot; $t_s$=t modulo S.

M=Matrix of size $(S \times N_{freq})$. This matrix may be used to keep track of slots that are already covered by beacon on a particular frequency (column index is the frequency index). For example, if (i,j)th entry in M=1, this may indicate that the ith slot on the jth frequency has already been covered by a previous beacon transmission.

At any given point in time when a beacon burst has to be transmitted, the algorithm finds a frequency such that beacon transmission on this frequency results in covering a maximum number of slots compared to other frequencies. The following steps may be performed to generate the beacon pattern:

1. Determine the set $S_{temp}$ consisting of the next BTD PCH slots (from time t to t+BTD−1) on which a beacon burst has to be transmitted.
2. Determine the slots $U_{temp}$={t1s, t2s, tUs} out of the $S_{temp}$, which can be covered successfully (i.e., useful slots) by beacon transmission on the next BTD slots.
3. For each frequency $F_i$(i=1, 2, . . . , Nfreq), determine $W_i$=Number of slots belonging to the set $U_{temp}$ that have not been covered successfully so far, i.e., entries in matrix M for frequency $F_i$ and slots $U_{temp}$ not equal to 1. $W_i$'s essentially represent the utility factor of transmitting beacons on frequency Fi.
4. Let $W_{max}$=max($W_i$) over all 'i' and the corresponding 'i' be imax. If $W_{max}$=0, i.e., all the slots are already covered go to step 8, otherwise go to step 5.
5. Set frequency of beacon transmission on the next BTD slots as $F_{imax}$. Set entries in matrix M corresponding to $F_{imax}$ and slots $U_{temp}$ to 1.
6. Determine the number of slots covered on all frequencies from matrix M. If all the S slots have been covered on all frequencies, go to step 8. Otherwise, continue the procedure from step 1 by setting t=t+BTD to determine the frequency of beacon transmission for the next BTD slots.
7. If all the slots in $U_{temp}$ have already been covered, stagger beacon transmission by U slots, i.e., set t=t+U and continue from step 1.
8. End The above procedure may be used to provide a frequency on which beacon should be transmitted on a given slot.

If mobile ATs requires the 1×RTT beacon to be detected in two successive wake-up cycles, then the above algorithm can be modified to take this into account and design the waveform. For example, for every beacon burst transmitted (say from t to t+BTD−1) on frequency $F_i$ the corresponding slots in the next slot cycle (t+S to t+S+BTD−1) should also have beacon transmitted on same frequency $F_i$. By taking this into account and avoiding frequency collisions, entire beacon waveform can be obtained.

Further 1×-RTT and DO Examples

In view of exemplary systems shown and described herein, methodologies that may be implemented in accordance with the disclosed subject matter, will be better appreciated with reference to various flow charts. All of these methodologies may be performed by a base station or other access point of the wireless communication system, using components as described in more detail elsewhere herein. Although any of these methodologies may be used to control transmission of 1×RTT and DO discovery beacons, they may also be used to control beacon transmission in systems using other transmission protocols. While for purposes of simplicity of explanation methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture such as, for example, a non-transitory computer-readable medium, to facilitate transporting and transferring such methodologies to various devices. Those skilled in the art will understand and appreciate that a method could alternatively be represented as a series of interrelated states or events, such as in a state diagram.

Figure 7:
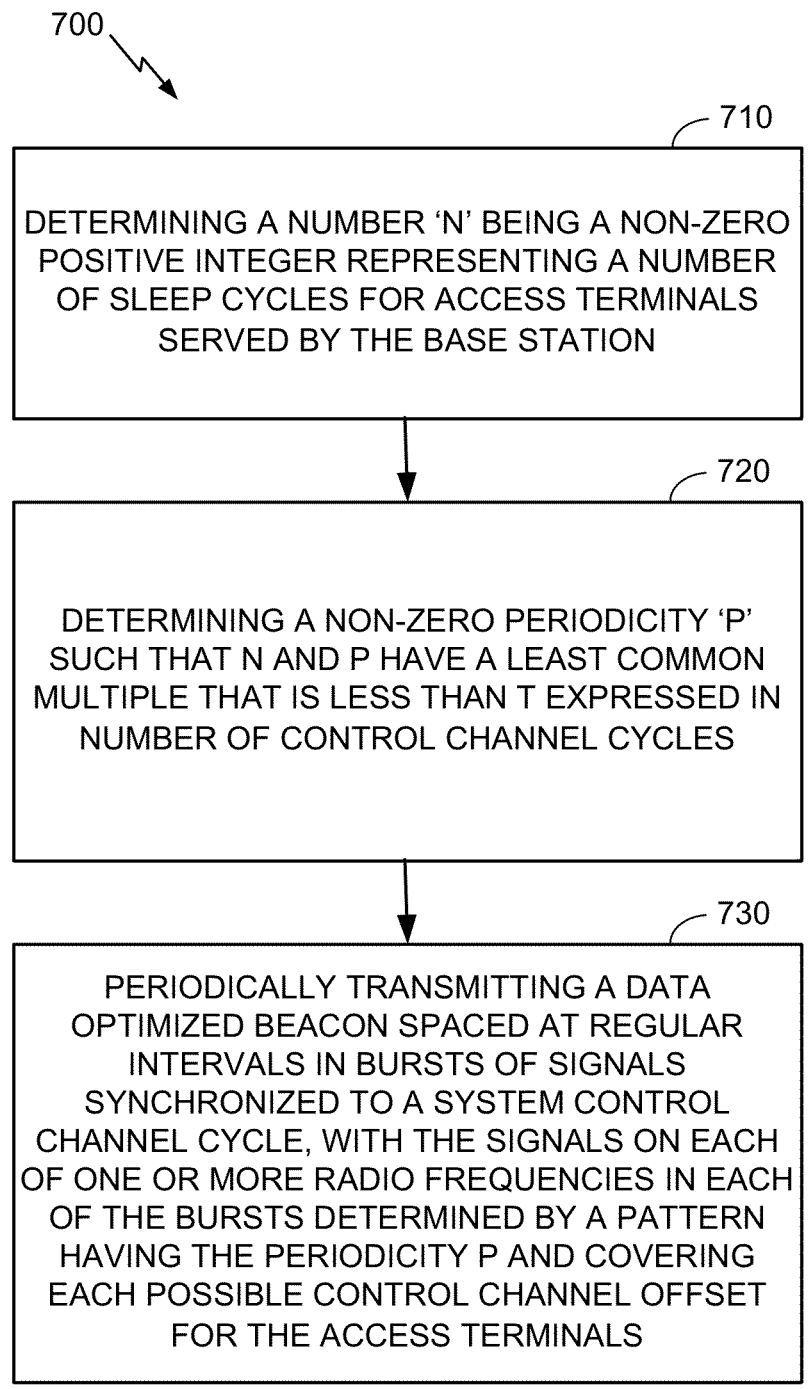
FIG. 7 illustrates an example of a method for controlling a periodic Evolved Data Optimized (EV-DO) beacon.
Figure 8A:
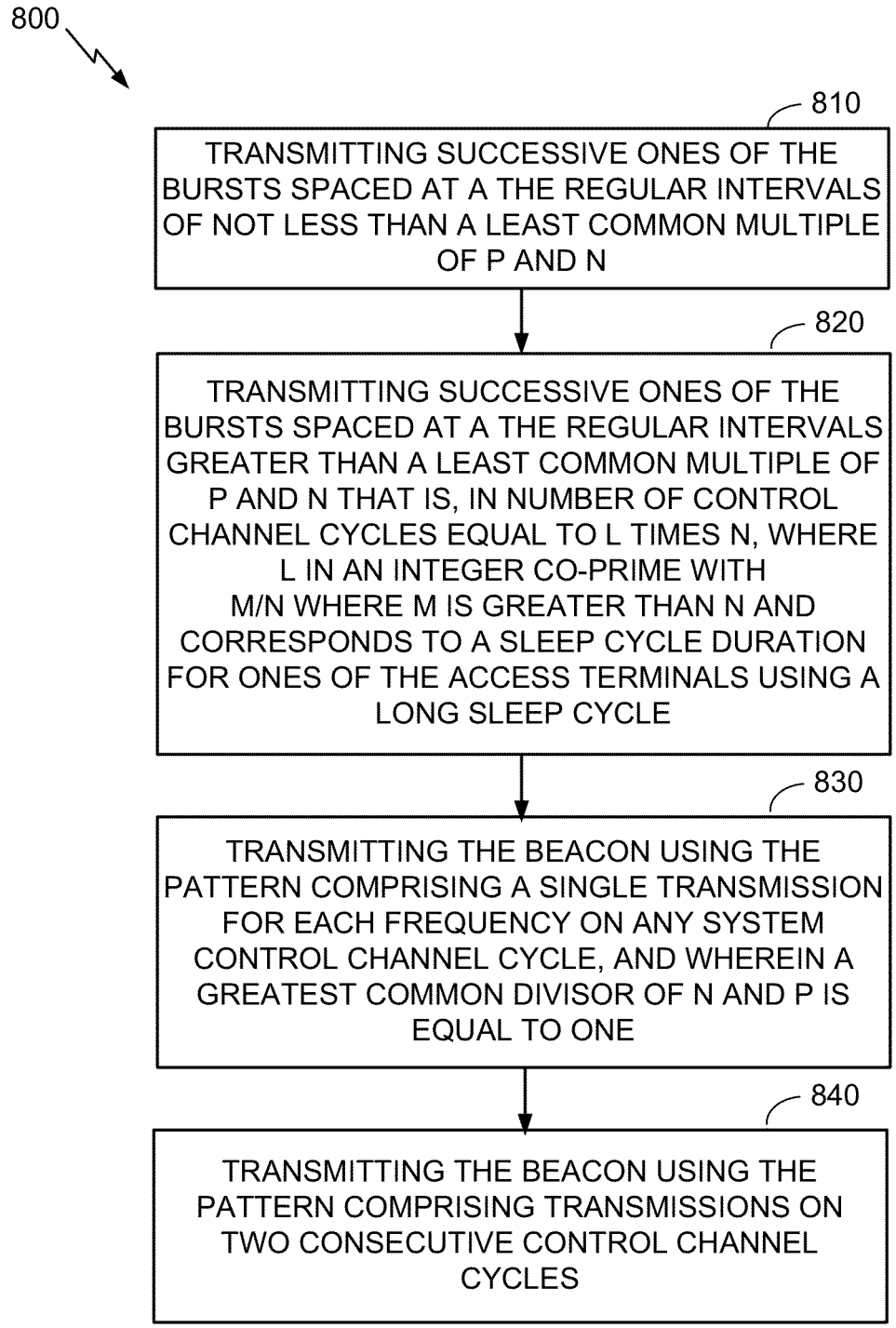

The method 700 shown in FIG. 7 may be used for controlling transmission of a periodic EV-DO beacon for DO wireless transmission by a base station of a wireless communication system to achieve a targeted discovery time 'T,' with FIGS. 8A, 8B and 8C showing further aspects 800 of the method of FIG. 7. The method 700 may be performed at a wireless communication apparatus, for example a HNB or femto base station for transmitting to a mobile access terminal. The method 700 may involve, at 710, determining a number 'N' being a non-zero positive integer representing a number of sleep cycles for access terminals served by the base station. For example, the HNB may recall or process a number N stored in a local memory or provided from another system entity. The method 700 may further comprise, at 720, determining a non-zero periodicity 'P' such that N and P have a least common multiple that is less than T expressed in number of control channel cycles. For example, the HNB may recall or process a number P stored in a local memory or provided from another system entity, or calculate P using a stored algorithm. The method 700 may further comprise, at 730, periodically transmitting a Data Optimized (DO) beacon spaced at regular intervals in bursts of signals synchronized to a system control channel cycle, with the signals on each of one or more radio frequencies in each of the bursts determined by a pattern having the periodicity P and covering each possible control channel offset for the access terminals. Each burst may include a sequence of the signals at one or more frequencies, for example as shown at 510 in FIG. 5 showing a 30 second DO burst consisting of signals at two frequencies ($F1_{DO}$ and $F2_{DO}$), and 12 signals at each of the frequency. The periodicity P is applied to a basic pattern consisting of 2 signals (one on each frequency) within the DO burst, for example to the 12 signals at each frequency illustrated at 510 of FIG. 5. The pattern may be repeated, for example, for 12 times to cover all 12 CC cycle offsets corresponding to N=12 sleep cycle duration. The regular intervals refer to spacing between successive DO bursts, for example as shown in FIG. 6 between successive bursts 610 ($T_{DT,worst}$). The HNB may transmit the burst, for example, using a defined transmit chain and transmitter. Further details and variations concerning controlling transmission of a periodic EV-DO beacon are disclosed below in connection with FIGS. 8A and 8B.

With reference to FIG. 8A, several operations 800 are depicted for controlling transmission of a periodic EV-DO beacon, which may be performed in the alternative to each other or in any operative combination. In one embodiment, controlling transmission of a periodic EV-DO beacon may involve, at 810, transmitting successive ones of the bursts at the regular intervals of not less than the least common multiple (LCM) of P and N. That is, each interval between respective signal bursts may be set to a value that is not less than (i.e., equal to or greater than) the LCM(P,N). In the alternative, or in addition, controlling transmission of the DO beacon may involve, at 820, transmitting successive ones of the bursts spaced at the regular intervals greater than a least common multiple of P and N that is, in number of control channel cycles, equal to L times N where L is an integer co-prime with M/N where M is greater than N and corresponds to a sleep cycle duration for ones of the access terminals using a long sleep cycle. That is, each interval between respective signal bursts may be set to a value computed using an algorithm as described in the foregoing sentence. The method may therefore include computing such value using the stated algorithm. In the alternative, or in addition, controlling transmission of the DO beacon may involve, at 830, transmitting the beacon using the pattern comprising a single transmission for each frequency on any system control channel cycle, and wherein a greatest common divisor of N and P is equal to one. This may be done in the special case where N and P are co-primes, for example 12 and 5 respectively, or some other co-prime pair. In the alternative, or in addition, controlling transmission of the DO beacon may involve, at 840, transmitting the beacon using the pattern comprising transmissions on two consecutive control channel cycles. This may be appropriate, for example, when the mobile ATs require transmissions on successive CC cycles for re-direction.

FIGS. 8B and 8C depict additional operations that may be performed in any operative order in addition to the elements shown in FIG. 8A. One or more of these additional operations may optionally be performed as part of method 800. The elements shown in FIGS. 8B-C may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 800 includes at least one of these operations, then the method 800 may terminate after the at least one operation, without necessarily having to include any subsequent downstream operation(s) that may be illustrated.

In an embodiment, referring now to FIG. 8B, controlling transmission of the DO beacon may involve transmitting additional bursts of signals configured as a 1×RTT beacon for 1×RTT wireless transmission in between the bursts of signals configured as the DO beacon, as shown at 850. This is the case with a time-shared beacon for both 1×RTT and DO. In such case, controlling transmission of the DO beacon may further include, at step 860, patterning the additional bursts of signals to have a worst case discovery time for a system of access terminals having N number of sleep cycles of not greater than one of the regular intervals ($T_{DT,worst}$) minus a duration of each signal burst in the DO beacon ($T_{DO,fast}$). More detailed examples have been provided hereinabove.

Referring to FIG. 8C, in the alternative, or in addition, controlling transmission of a periodic EV-DO beacon may include, at 870, transmitting the DO beacon triggered by completing a user registration for 1×RTT wireless transmission, in response to a numeric incremental register value indicating a non-zero number of pending DO registrations. In other words, an opportunistic DO beacon may be combined with the periodic mode DO beacon of method 700, using a special register to trigger the beacon. In this case, the additional operations 800 may further include, at 880, using the register to track numbers of pending DO registrations by incrementing and decrementing the register value in offsetting amounts corresponding to respective different events of completing a 1×RTT user registration and completing a DO user registration. Thus, an opportunistic DO beacon transmission may be triggered by the HNB when the register value indicates unequal numbers of 1×RTT and DO registrations within a relevant period.

Figure 9:
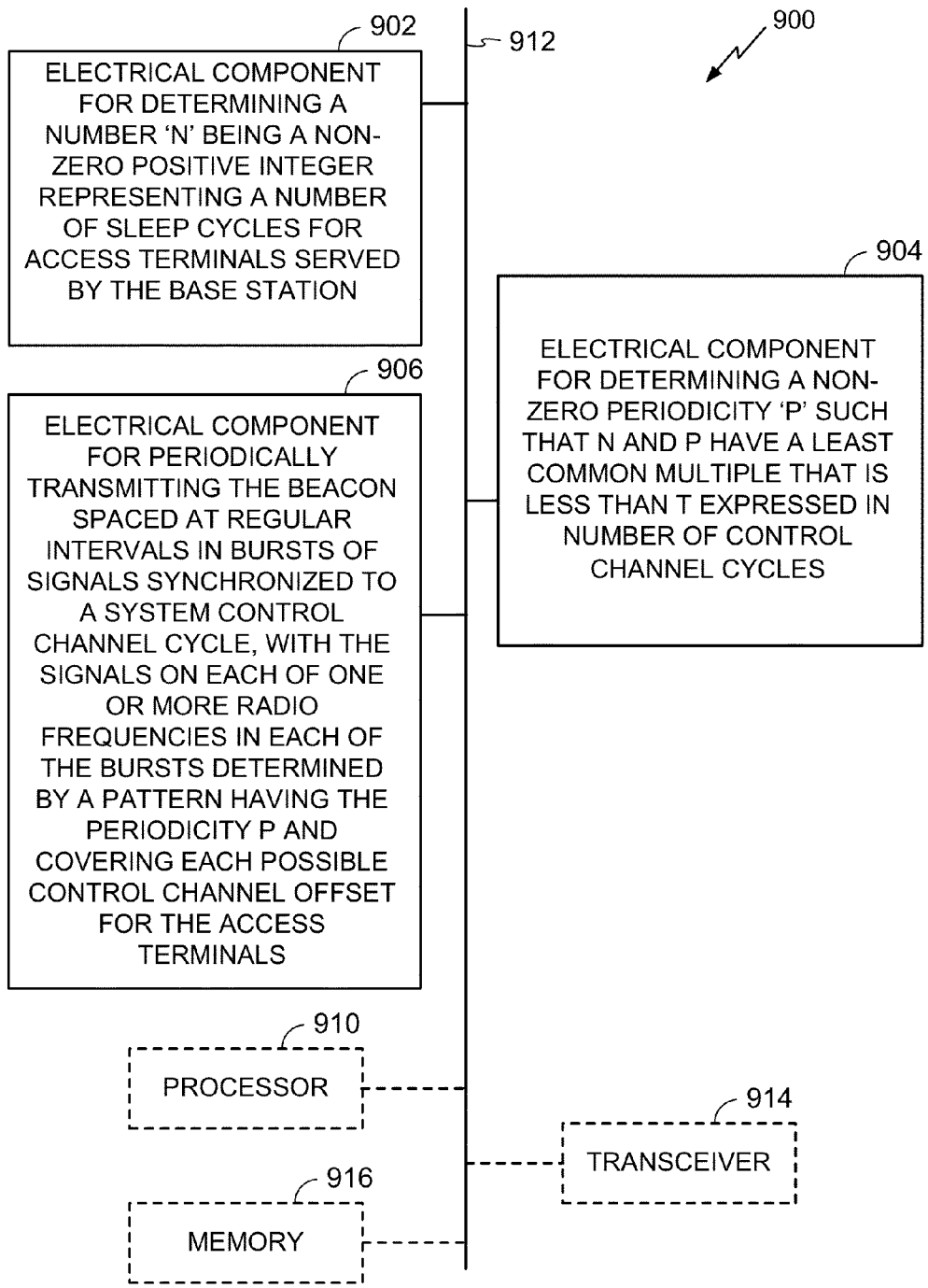
FIG. 9 illustrates an example of an apparatus for controlling a periodic EV-DO beacon.

With reference to FIG. 9, there is provided an exemplary apparatus 900 that may be configured as an HNB or base station in a wireless network, or as a processor or similar device for use within the node B or base station, controlling transmission of a periodic DO beacon for DO wireless transmission from a base station of a wireless communication system to achieve a targeted discovery time 'T'. The apparatus 900 may include functional blocks that can represent functions implemented by a processor, software, or combination thereof (e.g., firmware).

As illustrated, in one embodiment, the apparatus 900 may include an electrical component or module 902 for determining a number 'N' being a non-zero positive integer representing a non-zero integer number of sleep cycles for access terminals served by the base station. For example, the electrical component 902 may include at least one control processor coupled to a memory component. The electrical component 902 may be, or may include, a means for determining a number 'N' being a non-zero positive integer representing a number of sleep cycles for access terminals served by the base station. Said means may include the at least one control processor operating an algorithm. The algorithm may include, for example, retrieving a numeric value representing 'N' from a memory, selecting 'N' based on a characteristic value for an applicable transmission protocol, querying a network entity regarding 'N' for an applicable transmission protocol, or some combination of the foregoing.

The apparatus 900 may include an electrical component 904 for determining a non-zero periodicity 'P' such that N and P have a least common multiple that is less than T expressed in number of control channel cycles. For example, the electrical component 904 may include at least one control processor coupled to memory and/or network interface. The electrical component 904 may be, or may include, a means for determining a periodicity 'P' such that N and P have a least common multiple that is less than T expressed in number of control channel cycles. Said means may include the at least one control processor operating an algorithm. The algorithm may include, for example, retrieving a numeric value representing T from a memory, wherein T is greater than N, determining all integer multiples of N that are less than T, and setting P equal to a selected one of the integer multiples divided by N.

The apparatus 900 may include an electrical component 906 for periodically transmitting a Data Optimized (DO) beacon spaced at regular intervals in bursts of signals synchronized to a system control channel cycle, with the signals on each of one or more radio frequencies in each of the bursts determined by a pattern having the periodicity P and covering each possible control channel offset for the access terminals. For example, the electrical component 906 may include at least one control processor coupled to memory and wireless transmitter or the like. The electrical component 906 may be, or may include, a means for periodically transmitting a DO beacon spaced at regular intervals in bursts of signals synchronized to a system control channel cycle, with the signals on each of one or more radio frequencies in each of the bursts determined by a pattern having the periodicity P and covering each possible control channel offset for the access terminals. Said means may include the at least one control processor operating an algorithm. The algorithm may include, for example, synchronizing beacon transmission signals within a signal burst to a system control channel cycle, and generating each of the signal patterns within a burst to cover each possible control channel offset and having a periodicity equal to P. The apparatus 900 may include similar electrical components for performing any or all of the additional operations 800 described in connection with FIGS. 8A-C, which for illustrative simplicity are not shown in FIG. 9.

In related aspects, the apparatus 900 may optionally include a processor component 910 having at least one processor, in the case of the apparatus 900 configured as a network entity, e.g., an access point, for a wireless communication system. The processor 910, in such case, may be in operative communication with the components 902-906 or similar components via a bus 912 or similar communication coupling. The processor 910 may effect initiation and scheduling of the processes or functions performed by electrical components 902-906.

In further related aspects, the apparatus 900 may include a radio transceiver component 914. A stand alone receiver and/or stand alone transmitter may be used in lieu of or in conjunction with the transceiver 914. The apparatus 900 may optionally include a component for storing information, such as, for example, a memory device/component 916. The computer readable medium or the memory component 916 may be operatively coupled to the other components of the apparatus 900 via the bus 912 or the like. The memory component 916 may be adapted to store computer readable instructions and data for effecting the processes and behavior of the components 902-906, and subcomponents thereof, or the processor 910, or the methods disclosed herein. The memory component 916 may retain instructions for executing functions associated with the components 902-906. While shown as being external to the memory 916, it is to be understood that the components 902-906 can exist within the memory 916.

Figure 10A:
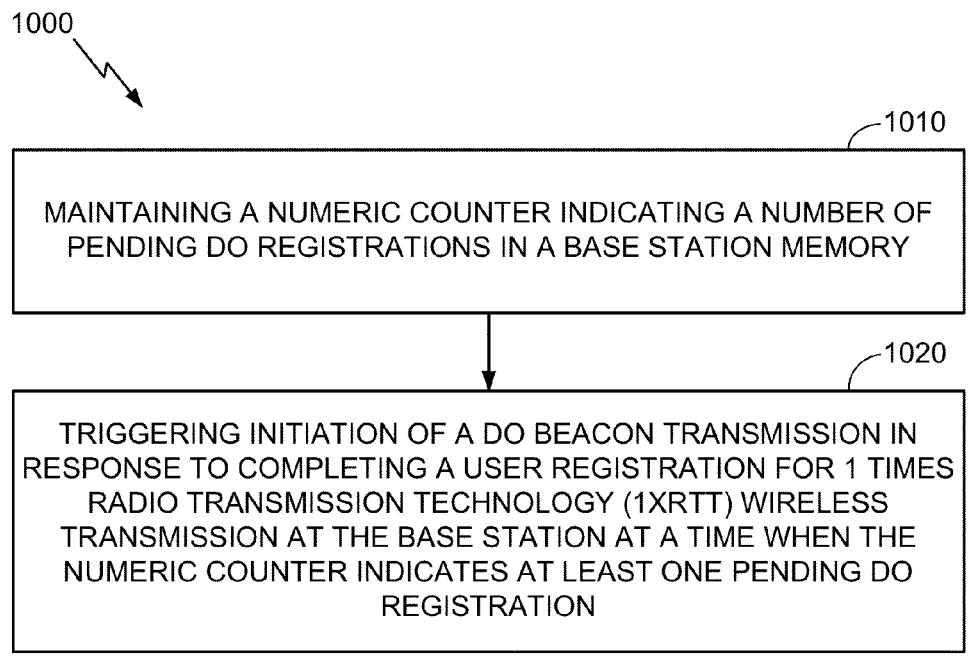
FIGS. 10A-B illustrate an example of a method for controlling an opportunistic EV-DO beacon, and additional aspects thereof.
Figure 10B:
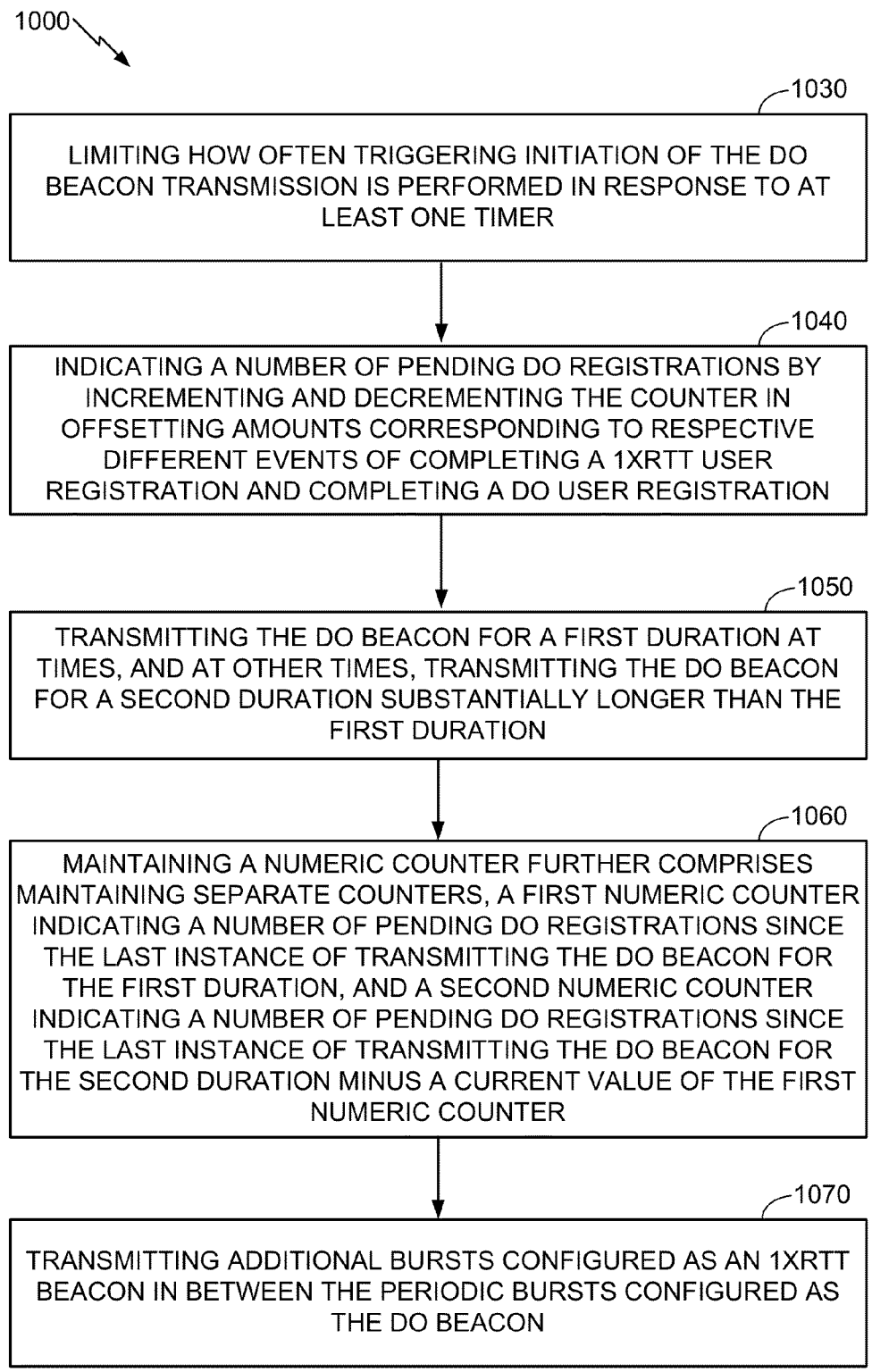

The method 1000 shown in FIG. 10A may be used for controlling transmission of opportunistic EV-DO beacon for DO wireless transmission from a base station of a wireless communication system, with FIG. 10B showing further aspects of the method of FIG. 10A. The method 1000 may be performed at a wireless communication apparatus, for example a HNB or femto base station for transmitting to a mobile access terminal. The method 1000 may include, at 1010, maintaining a numeric counter indicating a number of pending DO registrations in a base station memory. For example, the HNB may recall or process a counter stored in a local memory in response to registration input. The method 1000 may further include, at 1020, triggering initiation of a DO beacon transmission in response to completing a user registration for 1×RTT wireless transmission at the base station at a time when the numeric counter indicates at least one pending DO registration. The base station may avoid maintaining any list or other data structure that tracks currently registered users or access terminals that have registered for 1×RTT or other service with the base station. Instead, the base station may trigger the initiation of the DO beacon transmission solely in response to the numeric counter value when completing the 1×RTT registration. Accordingly, the base station may avoid administrative overhead associated with maintaining and using a record of 1×RTT registrations in a base station memory to control DO beacon transmission. Further details and variations concerning controlling transmission of an opportunistic EV-DO beacon are disclosed below in connection with FIG. 10B.

With reference to FIG. 10B, several operations are depicted for controlling transmission of an opportunistic EV-DO beacon, which may be performed in the alternative to each other or in any operative combination. One or more of these operations may optionally be performed as part of method 1000. The elements shown in FIG. 10B may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1000 includes at least one of these operations, then the method 1000 may terminate after the at least one operation, without necessarily having to include any subsequent downstream operation(s) that may be illustrated.

In one embodiment, controlling transmission of a periodic EV-DO beacon may involve, at 1030, limiting how often triggering initiation of the DO beacon transmission is performed in response to at least one timer. In the alternative, or in addition, the method 1000 may further include, at 1040, indicating a number of pending DO registrations by incrementing and decrementing the counter in offsetting amounts corresponding to respective different events of completing a 1×RTT user registration and completing a DO user registration. In the alternative, or in addition, the method 1000 may further include, at 1050, transmitting the DO beacon for a first duration at times, and at other times, transmitting the DO beacon for a second duration substantially longer than the first duration. In the alternative, or in addition, maintaining the numeric counter 1010 may further include, at 1060, maintaining separate counters, a first numeric counter indicating a number of pending DO registrations since the last instance of transmitting the DO beacon for the first duration, and a second numeric counter indicating a number of pending DO registrations since the last instance of transmitting the DO beacon for the second duration minus a current value of the first numeric counter. In the alternative, or in addition, the method 1000 may further include, at 1070, transmitting additional bursts configured as an 1×RTT beacon in between the periodic bursts configured as the DO beacon.

Figure 11:
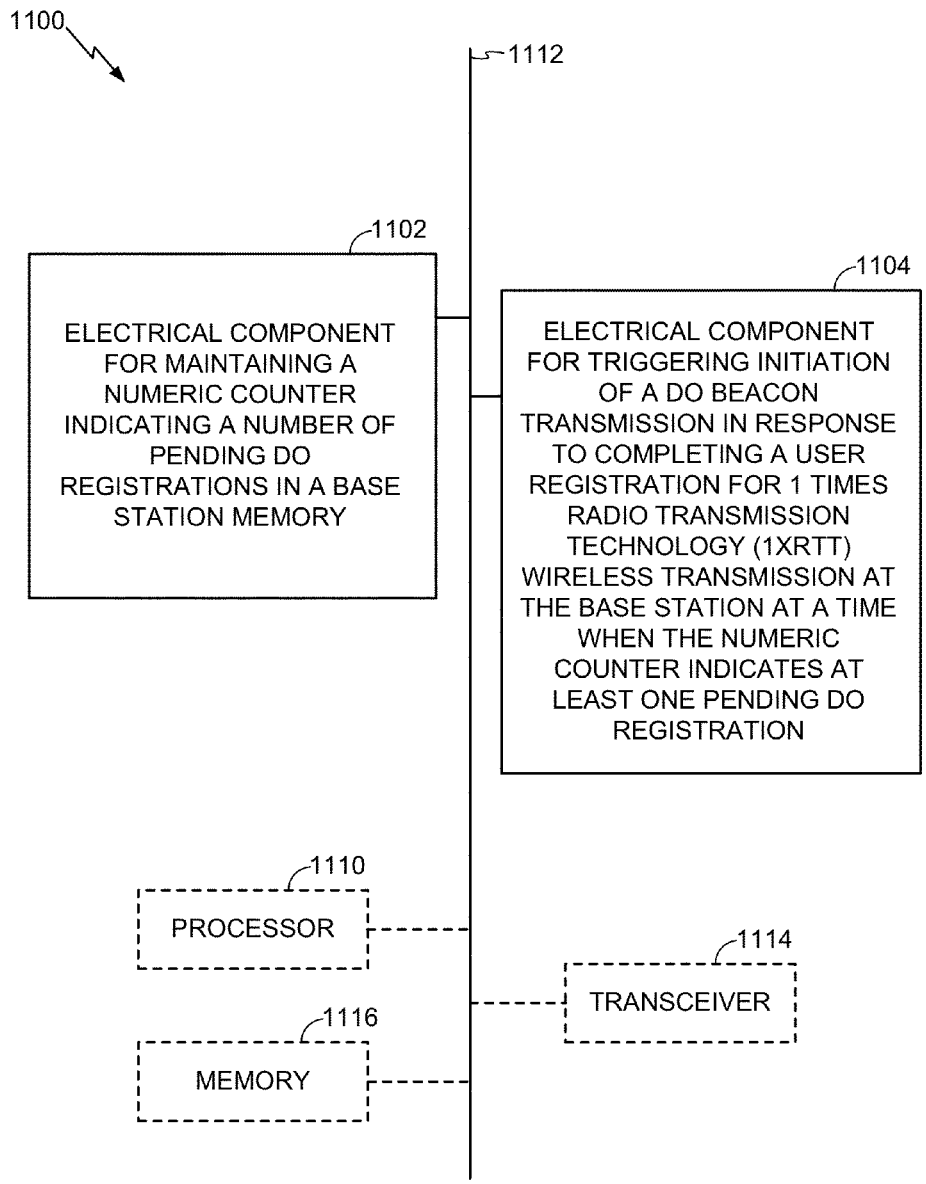
FIG. 11 illustrates an example of an apparatus for controlling an opportunistic EV-DO beacon.

With reference to FIG. 11, there is provided an exemplary apparatus 1100 that may be configured as an HNB or base station in a wireless network, or as a processor or similar device for use within the node B or base station, controlling transmission of an opportunistic DO beacon for DO wireless transmission from a base station of a wireless communication system. The apparatus 1100 may include functional blocks that can represent functions implemented by a processor, software, or combination thereof (e.g., firmware).

As illustrated, in one embodiment, the apparatus 1100 may include an electrical component or module 1102 for maintaining a numeric counter indicating a number of pending DO registrations in a base station memory. For example, the electrical component 1102 may include at least one control processor coupled to a memory component. The electrical component 1102 may be, or may include, a means for maintaining a numeric counter indicating a number of pending DO registrations in a base station memory. Said means may include the at least one control processor operating an algorithm. The algorithm may include, for example, initializing a counter variable upon system initialization or in response to a reset event, and incrementing and decrementing the counter variable in offsetting amounts corresponding to respective different events of completing a 1×RTT user registration and completing a DO user registration.

The apparatus 1100 may include an electrical component 1104 for triggering initiation of a DO beacon transmission in response to completing a user registration for 1 times Radio Transmission Technology (1×RTT) wireless transmission at the base station at a time when the numeric counter indicates at least one pending DO registration. For example, the electrical component 1104 may include at least one control processor coupled to memory and transmitter or the like. The electrical component 1104 may be, or may include, a means for triggering initiation of a DO beacon transmission in response to completing a user registration for 1 times Radio Transmission Technology (1×RTT) wireless transmission at the base station at a time when the numeric counter indicates at least one pending DO registration. Said means may include the at least one control processor operating an algorithm. The algorithm may include, for example, using an if-then branching test or similar logical structure triggered by a 1×RTT registration event, initiating a DO beacon transmission if a value of the numeric counter differs from a baseline value (e.g., zero). The apparatus 1100 may include similar electrical components for performing any or all of the additional operations described in connection with FIG. 10B, which for illustrative simplicity are not shown in FIG. 11.

In related aspects, the apparatus 1100 may optionally include a processor component 1110 having at least one processor, in the case of the apparatus 1100 configured as a network entity. The processor 1110, in such case, may be in operative communication with the components 1102-1104 or similar components via a bus 1112 or similar communication coupling. The processor 1110 may effect initiation and scheduling of the processes or functions performed by electrical components 1102-1104.

In further related aspects, the apparatus 1100 may include a radio transceiver component 1114. A stand alone receiver and/or stand alone transmitter may be used in lieu of or in conjunction with the transceiver 1114. The apparatus 1100 may optionally include a component for storing information, such as, for example, a memory device/component 1116. The computer readable medium or the memory component 1116 may be operatively coupled to the other components of the apparatus 1100 via the bus 1112 or the like. The memory component 1116 may be adapted to store computer readable instructions and data for effecting the processes and behavior of the components 1102-1104, and subcomponents thereof, or the processor 1110, or the methods disclosed herein. The memory component 1116 may retain instructions for executing functions associated with the components 1102-1104.

While shown as being external to the memory 1116, it is to be understood that the components 1102-1104 can exist within the memory 1116.

Figure 12A:
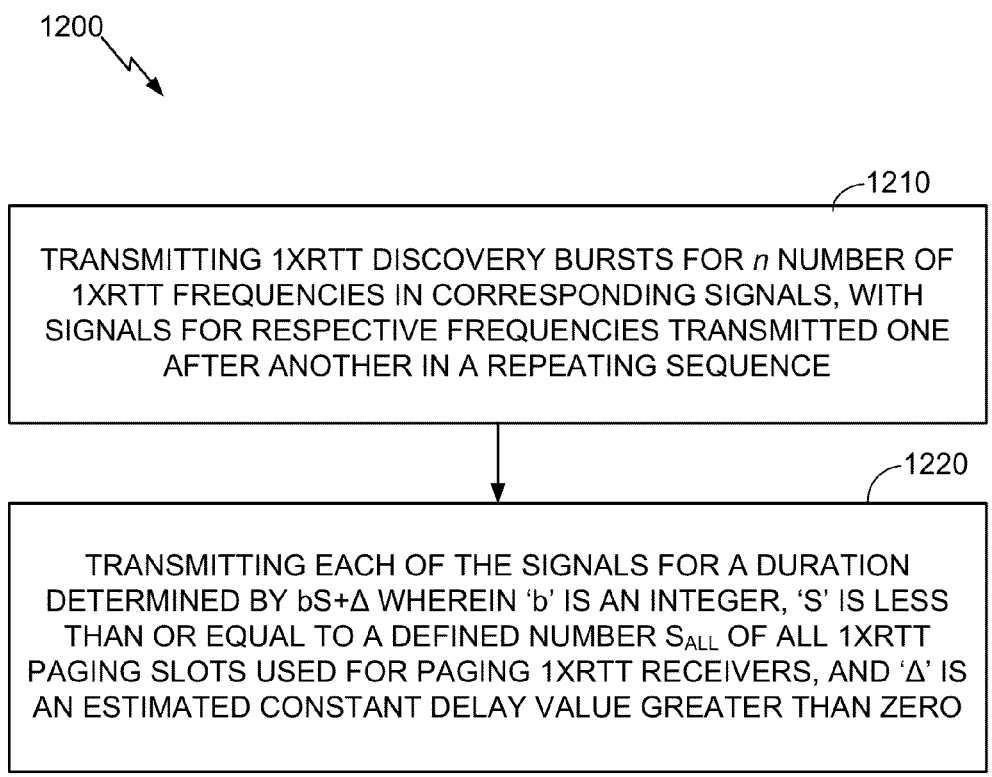
FIGS. 12A-C illustrate an example of a method for controlling a 1×RTT beacon according to a "non-greedy" algorithm, and additional aspects thereof.
Figure 12B:
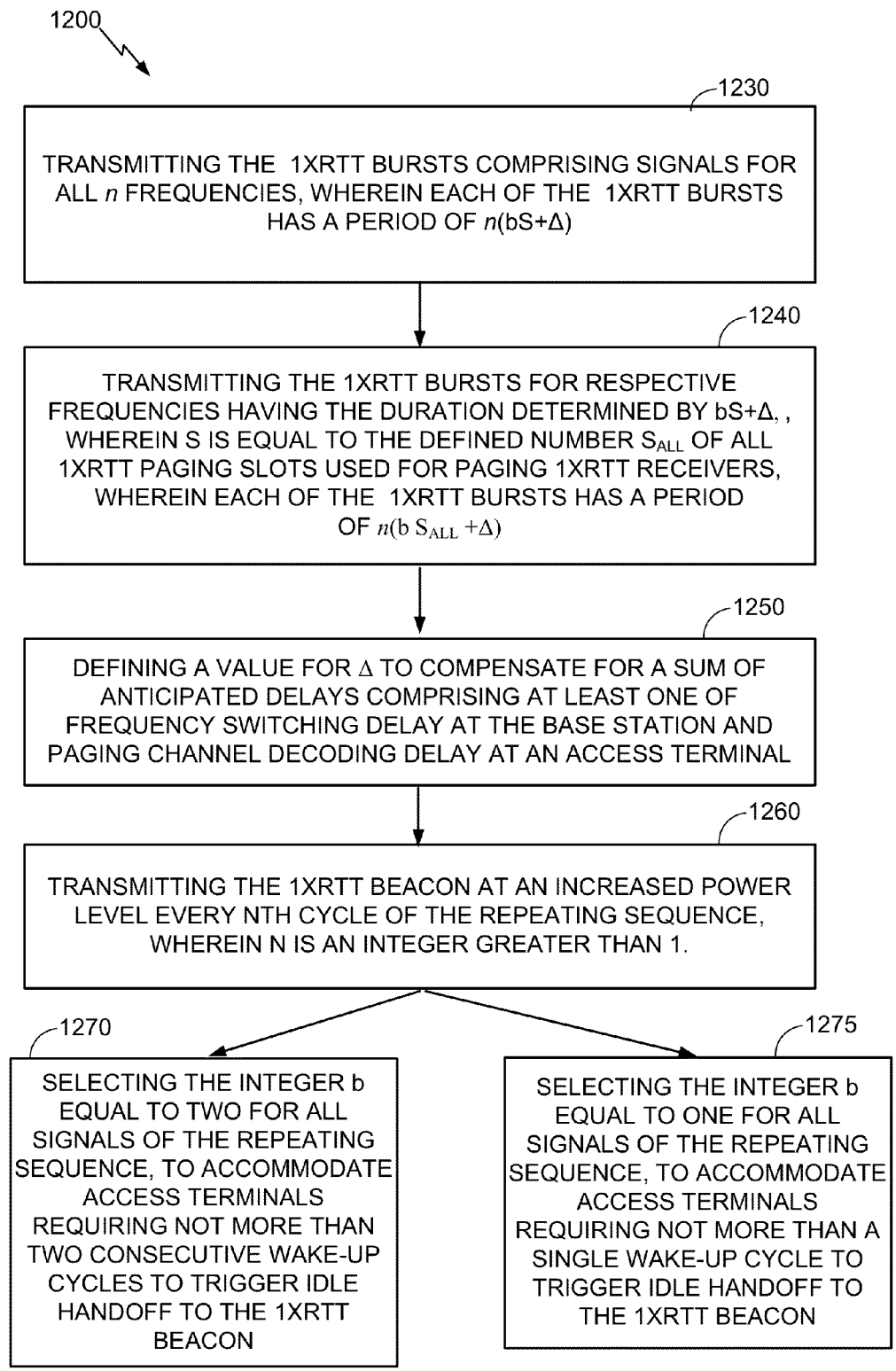
Figure 12C:
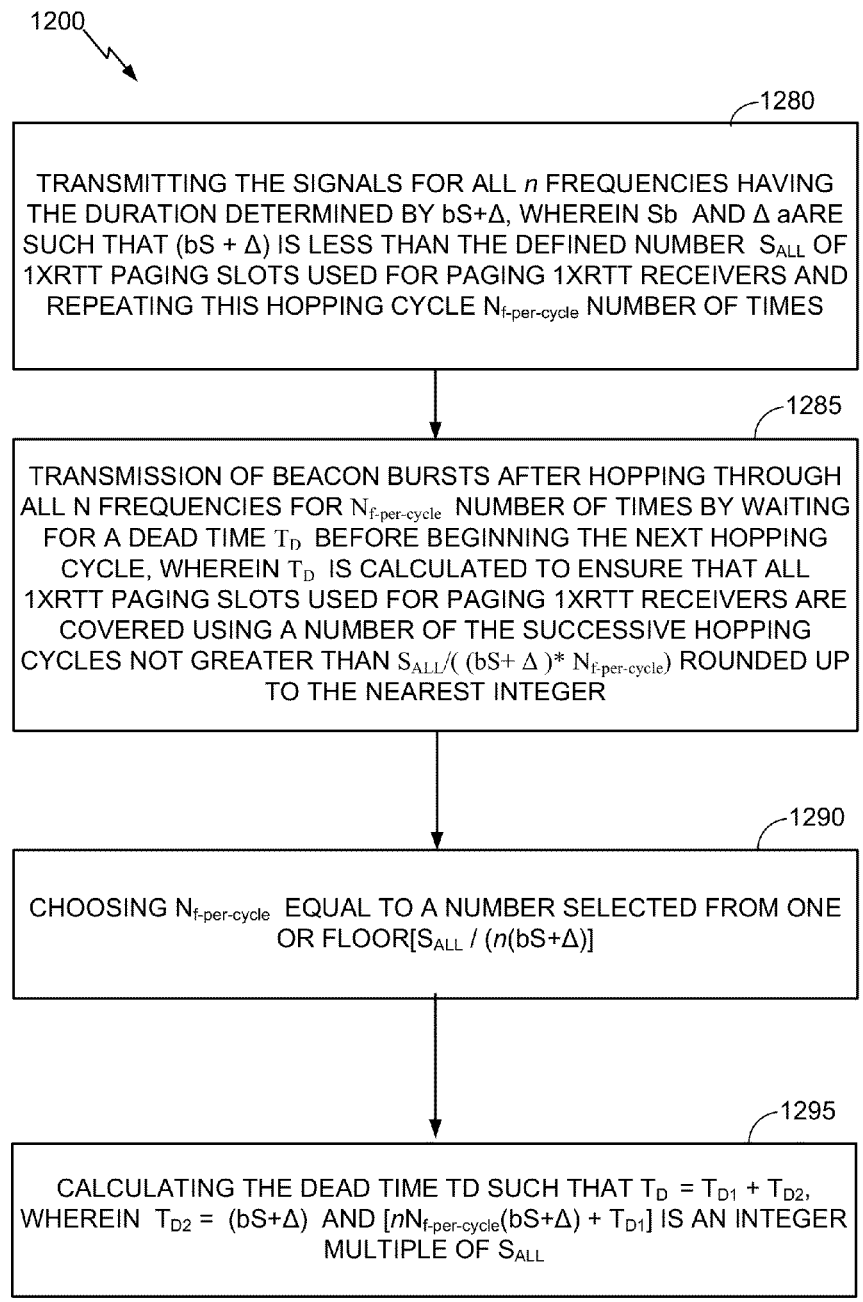

The method 1200 shown in FIG. 12A may be used for controlling transmission of a 1×RTT beacon from a base station of a wireless communication system according to a "non-greedy" algorithm, with FIGS. 12B-C showing further aspects of the method of FIG. 12A. The method 1200 may be performed at a wireless communication apparatus, for example a HNB or femto base station for transmitting to a mobile access terminal. The method 1200 may involve, at 1210, transmitting 1×RTT discovery bursts for n number of 1×RTT frequencies in corresponding signals, with signals for respective frequencies transmitted one after another in a repeating sequence. The method 1200 may further include, at 1220, transmitting each of the signals for a duration determined by $bS+\Delta$ wherein 'b' is an integer, 'S' is less than or equal to a defined number $S_{ALL}$ of all 1×RTT paging slots used for paging 1×RTT receivers, and '$\Delta$' is an estimated constant delay value greater than zero. Further details and variations concerning controlling transmission of a 1×RTT beacon are disclosed below in connection with FIGS. 12B-C.

With reference to FIGS. 12B and 12C, several operations are depicted for controlling transmission of a 1×RTT beacon, which may be performed in the alternative to each other or in any operative combination. One or more of these operations may optionally be performed as part of method 1200. The elements shown in FIGS. 12B-C may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1200 includes at least one of these operations, then the method 1200 may terminate after the at least one operation, without necessarily having to include any subsequent downstream operation(s) that may be illustrated.

Referring to FIG. 12B, in one embodiment, the method 1200 may further include, at 1230, transmitting the 1×RTT bursts comprising signals for all n frequencies, wherein each of the 1×RTT bursts has a period of $n(bS+\Delta)$. In the alternative, or in addition, the method 1200 may further include, at 1240, transmitting the 1×RTT bursts for respective frequencies having the duration determined by $bS+\Delta$, wherein S is equal to the defined number $S_{ALL}$ of all 1×RTT paging slots used for paging 1×RTT receivers, wherein each of the 1×RTT bursts has a period of $n(b\ S_{ALL}+\Delta)$. In the alternative, or in addition, the method 1200 may further include, at 1250, defining a value for $\Delta$ to compensate for a sum of anticipated delays comprising at least one of frequency switching delay at the base station and paging channel decoding delay at an access terminal. In the alternative, or in addition, the method 1200 may further include, at 1260, transmitting the 1×RTT beacon at an increased power level every Nth cycle of the repeating sequence, wherein N is an integer greater than 1. In the alternative, or in addition, the method 1200 may further include, at 1270, selecting the integer b equal to two for all signals of the repeating sequence, to accommodate access terminals requiring not more than two consecutive wake-up cycles to trigger idle handoff to the 1×RTT beacon. In the alternative to block 1270, the method 1200 may further include, at 1275, selecting the integer b equal to one for all signals of the repeating sequence, to accommodate access terminals requiring not more than a single wake-up cycle to trigger idle handoff to the 1×RTT beacon.

With reference to FIG. 12C, several further operations are depicted for controlling transmission of a 1×RTT beacon, which may be performed in the alternative to each other or in any operative combination. In one embodiment, the method 1200 may further include, at 1280, transmitting the signals for all n frequencies having the duration determined by $bS+\Delta$, wherein Sb, and $\Delta$ are such that $(bS+\Delta)$ is less than the defined number $S_{ALL}$ of 1×RTT paging slots used for paging 1×RTT receivers and repeating this hopping cycle $N_{f\text{-}per\text{-}cycle}$ number of times; and staggering transmission of beacon bursts after hopping through all n frequencies for $N_{f\text{-}per\text{-}cycle}$ number of times by waiting for a dead time $T_D$ before beginning the next hopping cycle, wherein $T_D$ is calculated to ensure that all 1×RTT paging slots used for paging 1×RTT receivers are covered using a number of the successive hopping cycles not greater than $S_{ALL}/((bS+\Delta)*N_{f\text{-}per\text{-}cycle})$ rounded up to the nearest integer. The method 1200 may further include, at 1285, transmitting the 1×RTT bursts comprising signals for all n frequencies, wherein each of the 1×RTT bursts has a period of $n(bS+\Delta)$. The method 1200 may further include, at 1290, choosing $N_{f\text{-}per\text{-}cycle}$ equal to a number selected from one or floor $[S_{ALL}/(n(bS+\Delta)]$. Consistent with the foregoing, $N_{f\text{-}per\text{-}cycle}$ may be selected such that the total duration after hopping $N_{f\text{-}per\text{-}cycle}$ times on each frequency with duration $(bS+\Delta)$ is less than $S_{all}$. The method 1200 may further include, at 1295, calculating the dead time $T_D$ such that $T_D = T_{D1} + T_{D2}$, wherein $T_{D2} = (bS+\Delta)$ and $[nN_{f\text{-}per\text{-}cycle}(bS+\Delta)+T_{D1}]$ is an integer multiple of $S_{ALL}$.

Figure 13:
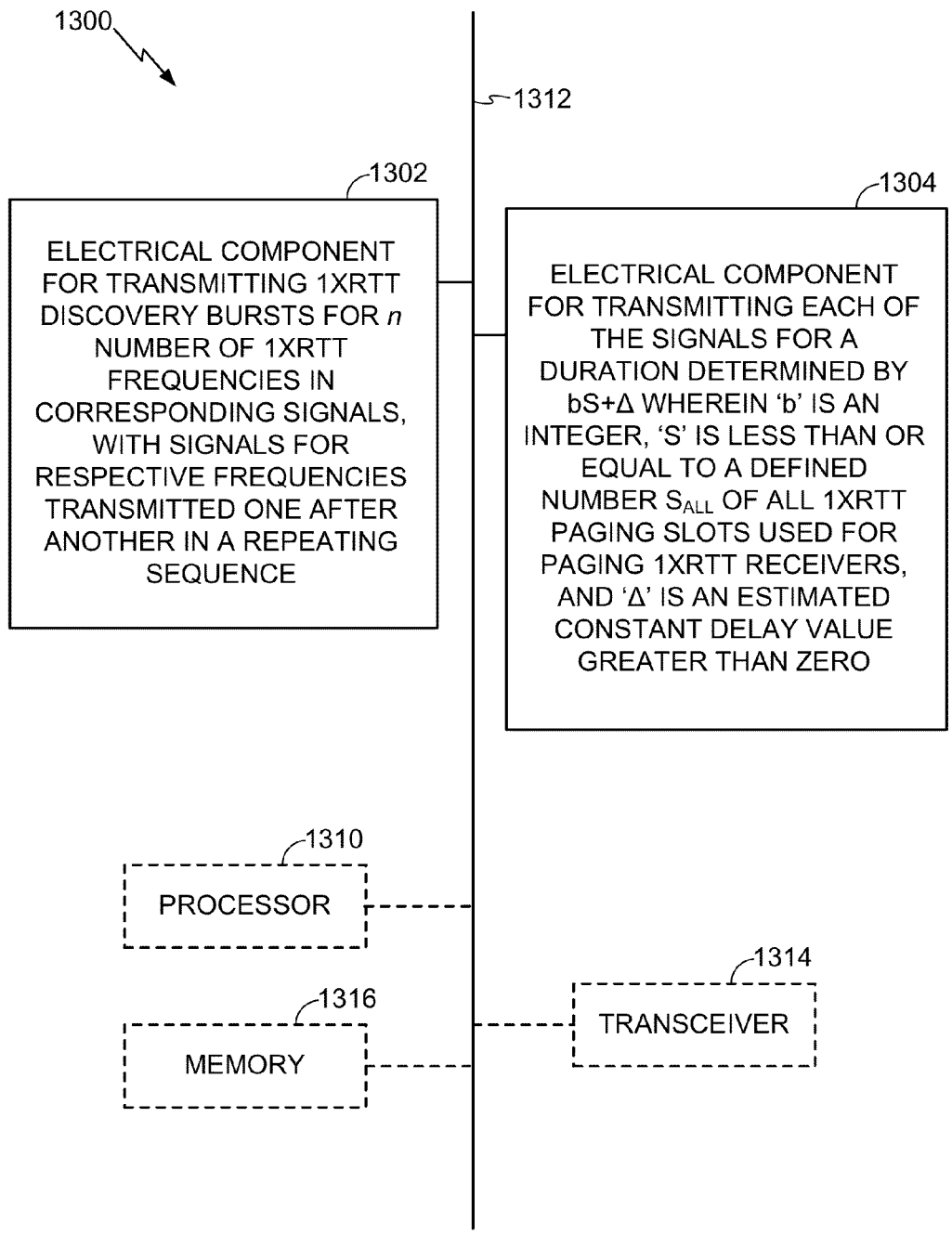
FIG. 13 illustrates an example of an apparatus for controlling a 1×RTT bacon according to the method of FIG. 12A.

With reference to FIG. 13, there is provided an exemplary apparatus 1300 that may be configured as an HNB or base station in a wireless network, or as a processor or similar device for use within the node B or base station, controlling transmission of a 1×RTT beacon for 1×RTT wireless transmission from a base station of a wireless communication system according to the method 1200. The apparatus 1300 may include functional blocks that can represent functions implemented by a processor, software, or combination thereof (e.g., firmware).

As illustrated, in one embodiment, the apparatus 1300 may include an electrical component or module 1302 for transmitting 1×RTT discovery bursts for n number of 1×RTT frequencies in corresponding signals, with signals for respective frequencies transmitted one after another in a repeating sequence. For example, the electrical component 1302 may include at least one control processor coupled to a transmitter component. The electrical component 1302 may be, or may include, a means for transmitting 1×RTT discovery bursts for n number of 1×RTT frequencies in corresponding signals, with signals for respective frequencies transmitted one after another in a repeating sequence. Said means may include the at least one control processor operating an algorithm. The algorithm may include, for example, generating a repeated sequence of n 1×RTT discovery bursts at the respective frequencies, and transmitting the repeated sequence from a transmitter.

The apparatus 1300 may include an electrical component 1304 for transmitting each of the signals for a duration determined by $bS+\Delta$ wherein 'b' is an integer, 'S' is less than or equal to a defined number $S_{ALL}$ of all 1×RTT paging slots used for paging 1×RTT receivers, and '$\Delta$' is an estimated constant delay value greater than zero. For example, the electrical component 1304 may include at least one control processor coupled to memory and transmitter or the like. The electrical component 1304 may be, or may include, a means for transmitting each of the signals for a duration determined by $bS+\Delta$ wherein 'b' is an integer, 'S' is less than or equal to a defined number $S_{ALL}$ of all 1×RTT paging slots used for paging 1xRTT receivers, and 'Δ' is an estimated constant delay value greater than zero. Said means may include the at least one control processor operating an algorithm. The algorithm may include, for example, selecting an integer value for b, selecting a value of S less than or equal to a defined number $S_{ALL}$ of all 1xRTT paging slots used for paging 1xRTT receivers, estimating a constant delay value Δ greater than zero, determining the duration by the relation bS+Δ, and controlling the duration of transmission according to the determined duration value. The apparatus 1300 may include similar electrical components for performing any or all of the additional operations described in connection with FIGS. 12B-C, which for illustrative simplicity are not shown in FIG. 13.

In related aspects, the apparatus 1300 may optionally include a processor component 1310 having at least one processor, in the case of the apparatus 1300 configured as an access point. The processor 1310, in such case, may be in operative communication with the components 1302-1304 or similar components via a bus 1312 or similar communication coupling. The processor 1310 may effect initiation and scheduling of the processes or functions performed by electrical components 1302-1304.

In further related aspects, the apparatus 1300 may include a radio transceiver component 1314. A stand alone receiver and/or stand alone transmitter may be used in lieu of or in conjunction with the transceiver 1314. The apparatus 1300 may optionally include a component for storing information, such as, for example, a memory device/component 1316. The computer readable medium or the memory component 1316 may be operatively coupled to the other components of the apparatus 1300 via the bus 1312 or the like. The memory component 1316 may be adapted to store computer readable instructions and data for effecting the processes and behavior of the components 1302-1304, and subcomponents thereof, or the processor 1310, or the methods disclosed herein. The memory component 1316 may retain instructions for executing functions associated with the components 1302-1304. While shown as being external to the memory 1316, it is to be understood that the components 1302-1304 can exist within the memory 1316.

Figure 14:
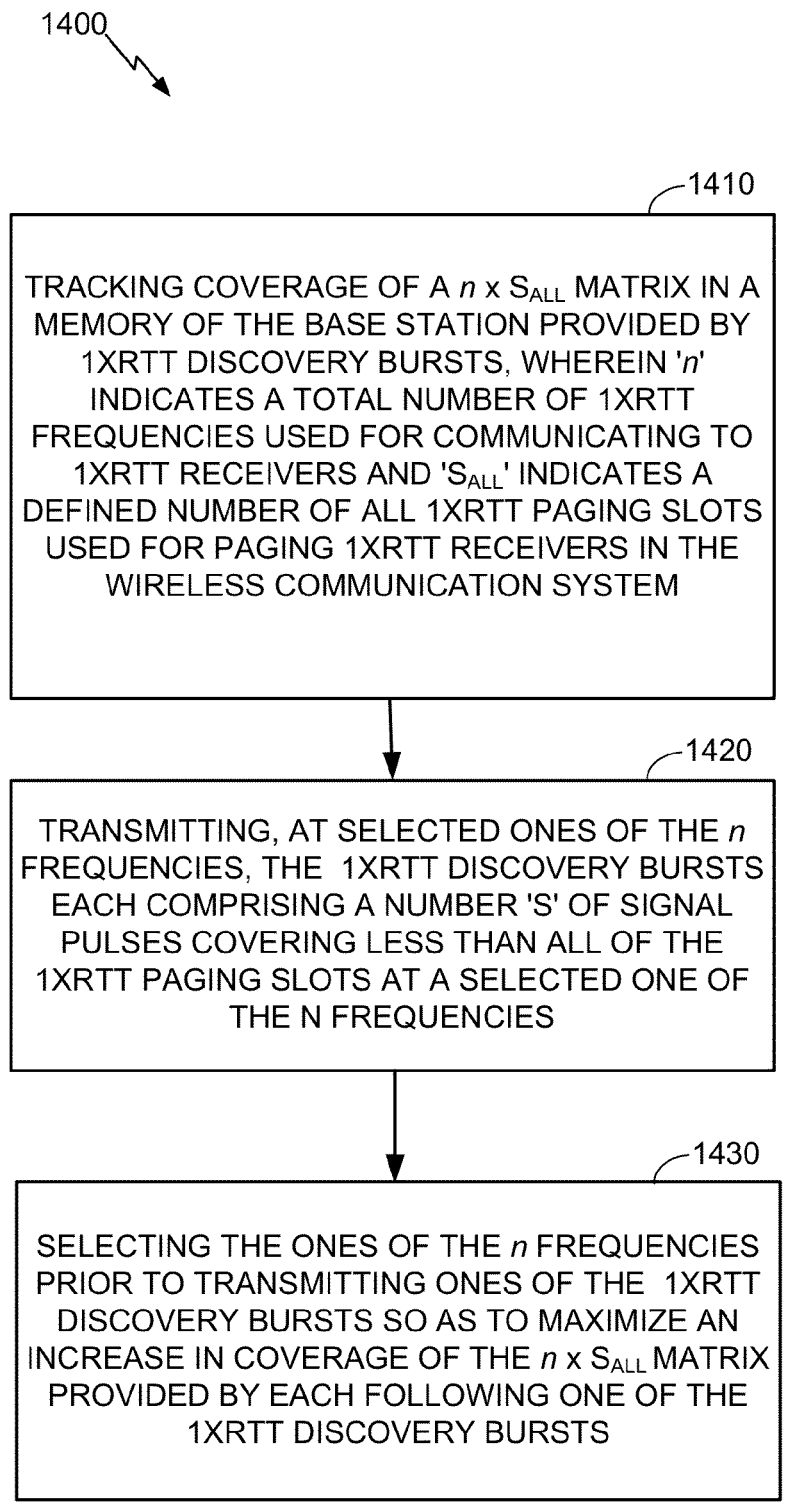
FIG. 14 illustrates an example of a method for controlling a 1×RTT beacon according to a "greedy" algorithm.
Figure 15:
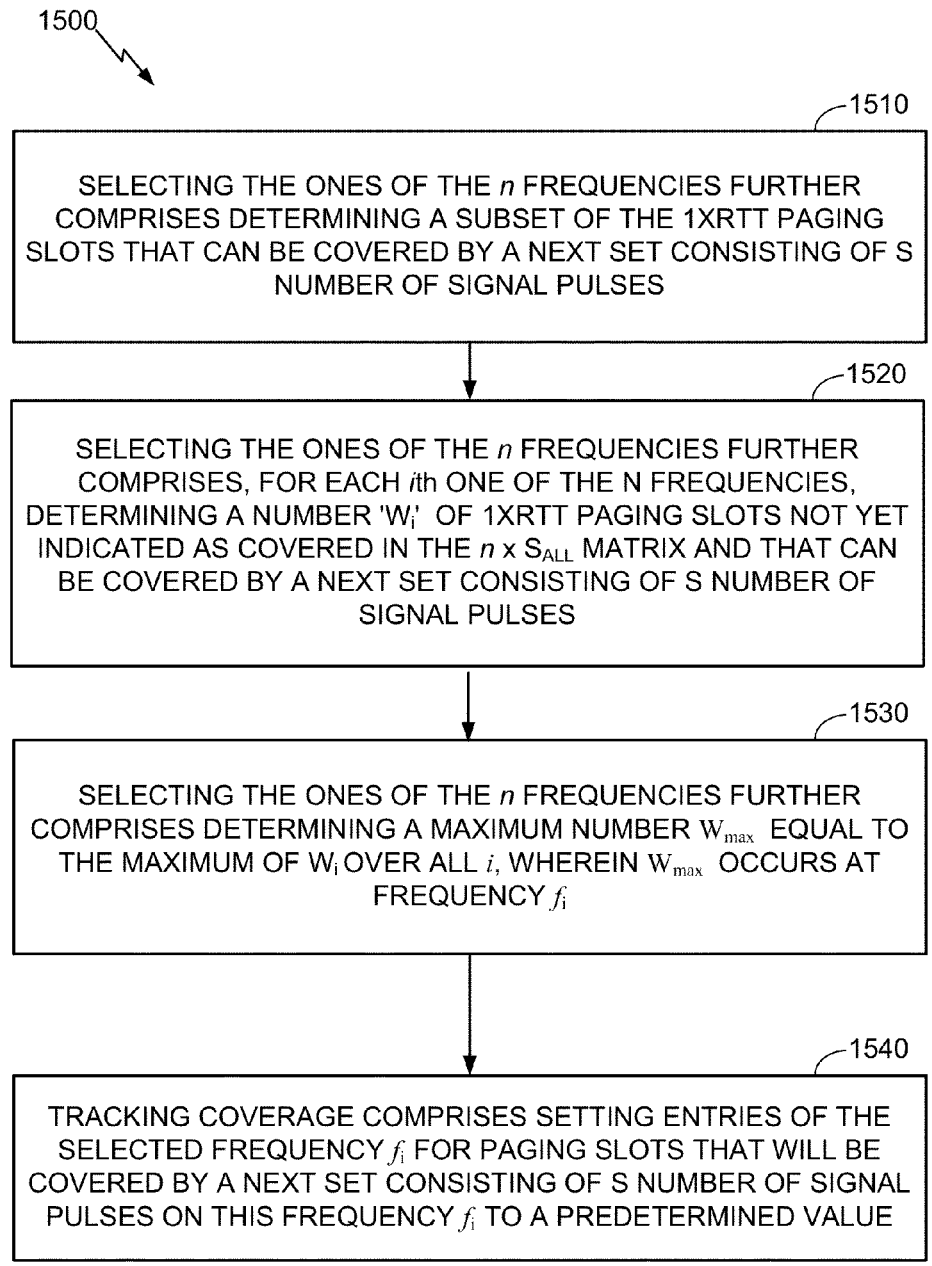
FIG. 15 shows further aspects of the method of FIG. 14.

The method 1400 shown in FIG. 14 may be used for controlling transmission of a 1xRTT beacon from a base station of a wireless communication system according to a "greedy" algorithm, with FIG. 15 showing further aspects of the method of FIG. 14. The method 1400 may be performed at a wireless communication apparatus, for example a HNB or femto base station for transmitting to a mobile access terminal. The method 1400 may involve, at 1410, tracking coverage of a $n \times S_{ALL}$ matrix in a memory of the base station provided by 1xRTT discovery bursts, wherein 'n' indicates a total number of 1xRTT frequencies used for communicating to 1xRTT receivers and '$S_{ALL}$' indicates a defined number of all 1xRTT paging slots used for paging 1xRTT receivers in the wireless communication system. This may include, for example, setting matrix element to a predetermined value in response to completing transmission of a signal covering a matrix element. The method 1400 may further include, at 1420, transmitting, at selected ones of the n frequencies, the 1xRTT discovery bursts each comprising a number 'S' of signal pulses covering less than all of the 1xRTT paging slots at a selected one of the n frequencies. The method 1400 may further include, at 1430, selecting the ones of the n frequencies prior to transmitting ones of the 1xRTT discovery bursts so as to maximize an increase in coverage of the $n \times S_{ALL}$ matrix provided by each following one of the 1xRTT discovery bursts. Further details and variations concerning controlling transmission of a 1xRTT beacon are disclosed below in connection with FIG. 15.

With reference to FIG. 15, several additional operations 1500 are depicted for controlling transmission of a 1xRTT beacon, which may be performed in the alternative to each other or in any operative combination. One or more of operations 1500 may optionally be performed as part of method 1400. The elements 1500 may be performed in any operative order, or may be encompassed by a development algorithm without requiring a particular chronological order of performance. Operations are independently performed and not mutually exclusive. Therefore any one of such operations may be performed regardless of whether another downstream or upstream operation is performed. For example, if the method 1400 includes at least one of the operations 1500, then the method 1400 may terminate after the at least one operation, without necessarily having to include any subsequent downstream operation(s) that may be illustrated.

In one embodiment, selecting the ones of the n frequencies 1430 of the method 1400 may further include, at 1510, determining a subset of the 1xRTT paging slots that can be covered by a next set consisting of S number of signal pulses. In the alternative, or in addition, selecting the ones of the n frequencies 1430 of the method 1400 may further include, at 1520, for each ith one of the n frequencies, determining a number '$W_i$' of 1xRTT paging slots not yet indicated as covered in the $n \times S_{ALL}$ matrix and that can be covered by a next set consisting of S number of signal pulses. In the alternative, or in addition, selecting the ones of the n frequencies 1430 of the method 1400 may further include, at 1530, determining a maximum number $W_{max}$ equal to the maximum of $W_i$ over all i, wherein $W_{max}$ occurs at frequency $f_i$. In the alternative, or in addition, the tracking coverage 1410 of the method 1400 may further include, at 1540, setting entries of the selected frequency $f_i$ for paging slots that will be covered by a next set consisting of S number of signal pulses on this frequency $f_i$ to a predetermined value. Once the entire $n \times S_{ALL}$ matrix is covered, all the entries in the matrix may be cleared out and the cycle repeated. In an alternative maintaining the $n \times S_{ALL}$ matrix in real-time, a pattern may be pre-computed offline using an identical procedure as described above, and loaded into a memory of the access point, e.g., a Femto Access Point (FAP) memory. The FAP or other access point may then transmit beacons on different frequencies by reading from this memory.

Figure 16:
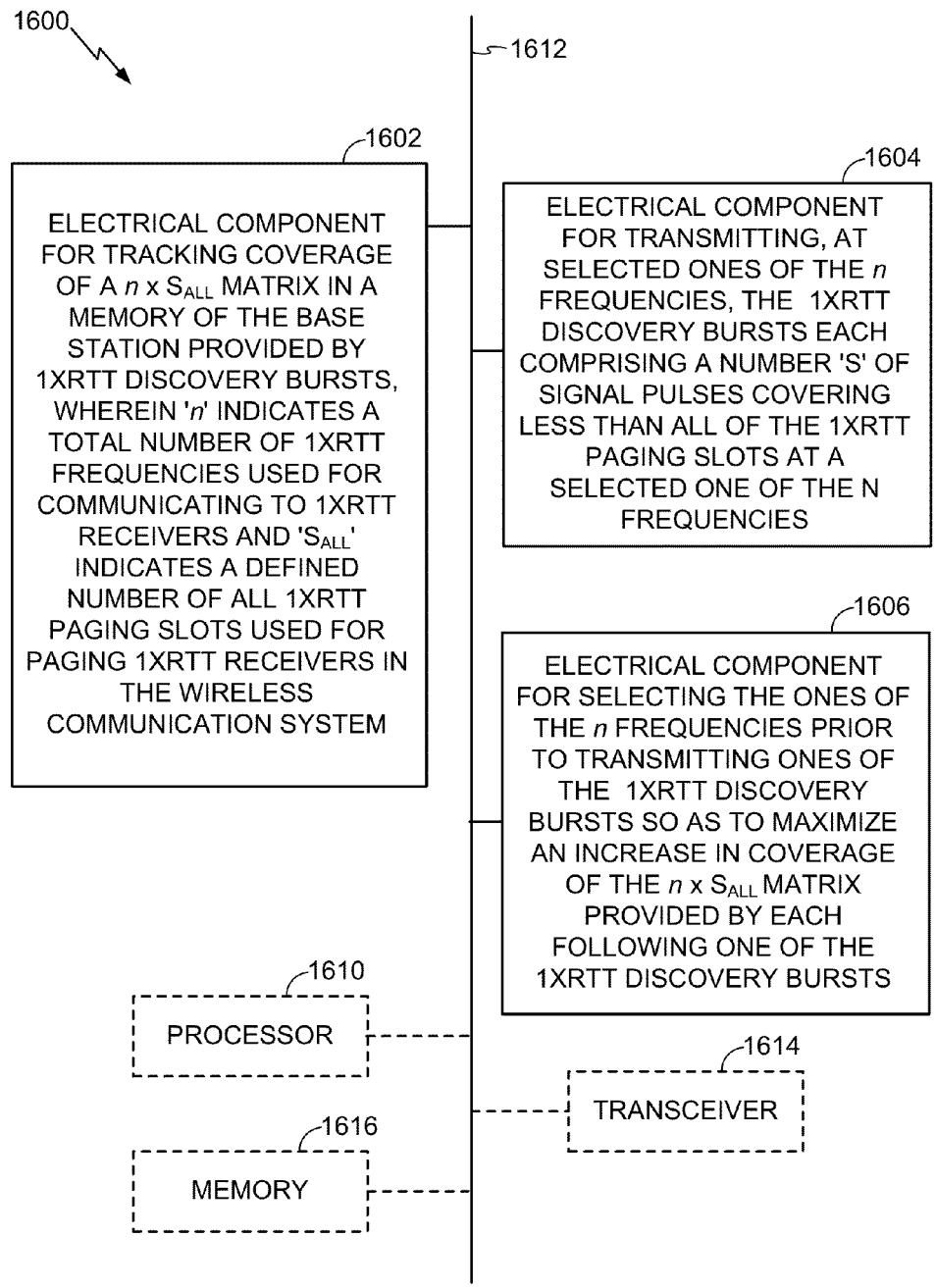
FIG. 16 illustrates an example of an apparatus for controlling a 1×RTT beacon according to a "greedy" algorithm.

With reference to FIG. 16, there is provided an exemplary apparatus 1600 that may be configured as an HNB or base station in a wireless network, or as a processor or similar device for use within the node B or base station, controlling transmission of a 1xRTT beacon for 1xRTT wireless transmission from a base station of a wireless communication system according to the method 1400. The apparatus 1600 may include functional blocks that can represent functions implemented by a processor, software, or combination thereof (e.g., firmware).

As illustrated, in one embodiment, the apparatus 1600 may include an electrical component or module 1602 for tracking coverage of a $n \times S_{ALL}$ matrix in a memory of the base station provided by 1xRTT discovery bursts, wherein 'n' indicates a total number of 1xRTT frequencies used for communicating to 1xRTT receivers and '$S_{ALL}$' indicates a defined number of all 1xRTT paging slots used for paging 1xRTT receivers in the wireless communication system. For example, the electrical component 1602 may include at least one control processor coupled to a memory component. The electrical component 1602 may be, or may include, a means for tracking coverage of a n×$S_{ALL}$ matrix in a memory of the base station provided by 1×RTT discovery bursts, wherein 'n' indicates a total number of 1×RTT frequencies used for communicating to 1×RTT receivers and '$S_{ALL}$' indicates a defined number of all 1×RTT paging slots used for paging 1×RTT receivers in the wireless communication system. Said means may include the at least one control processor operating an algorithm. The algorithm may include, for example, maintaining a n×$S_{ALL}$ matrix in a memory of the base station provided by 1×RTT discovery bursts, wherein 'n' indicates a total number of 1×RTT frequencies used for communicating to 1×RTT receivers and '$S_{ALL}$' indicates a defined number of all 1×RTT paging slots used for paging 1×RTT receivers in the wireless communication system, and recording values in the matrix in response to beacon transmissions.

The apparatus 1600 may include an electrical component 1604 for transmitting, at selected ones of the n frequencies, the 1×RTT discovery bursts each comprising a number 'S' of signal pulses covering less than all of the 1×RTT paging slots at a selected one of the n frequencies. For example, the electrical component 1604 may include at least one control processor coupled to memory and transmitter or the like. The electrical component 1604 may be, or may include, a means for transmitting, at selected ones of the n frequencies, the 1×RTT discovery bursts each comprising a number 'S' of signal pulses covering less than all of the 1×RTT paging slots at a selected one of the n frequencies. Said means may include the at least one control processor operating an algorithm. The algorithm may include, for example, selecting one or more of the n frequencies, configuring the 1×RTT discovery bursts so that the number 'S' of signal pulses aligns with than all of the 1×RTT paging slots, and transmitting the 1×RTT discovery bursts.

The apparatus 1600 may further include an electrical component 1606 for selecting the ones of the n frequencies prior to transmitting ones of the 1×RTT discovery bursts so as to maximize an increase in coverage of the n×$S_{ALL}$ matrix provided by each following one of the 1×RTT discovery bursts. For example, the electrical component 1606 may include at least one control processor coupled to a memory component. The electrical component 1606 may be, or may include, a means for selecting the ones of the n frequencies prior to transmitting ones of the 1×RTT discovery bursts so as to maximize an increase in coverage of the n×$S_{ALL}$ matrix provided by each following one of the 1×RTT discovery bursts. Said means may include the at least one control processor operating an algorithm. The algorithm may include, for example, estimating an increase in coverage of the n×$S_{ALL}$ matrix provided by prospective ones of the 1×RTT discovery bursts for respective unused ones of the n frequencies, and selecting the frequency for the prospective burst for which the estimated increase in coverage is a maximum. The apparatus 1600 may include similar electrical components for performing any or all of the additional operations 1500 described in connection with FIG. 15, which for illustrative simplicity are not shown in FIG. 16.

In related aspects, the apparatus 1600 may optionally include a processor component 1610 having at least one processor, in the case of the apparatus 1600 configured as a network entity. The processor 1610, in such case, may be in operative communication with the components 1602-1606 or similar components via a bus 1612 or similar communication coupling. The processor 1610 may effect initiation and scheduling of the processes or functions performed by electrical components 1602-1606.

In further related aspects, the apparatus 1600 may include a radio transceiver component 1614. A stand alone receiver and/or stand alone transmitter may be used in lieu of or in conjunction with the transceiver 1614. The apparatus 1600 may optionally include a component for storing information, such as, for example, a memory device/component 1616. The computer readable medium or the memory component 1616 may be operatively coupled to the other components of the apparatus 1600 via the bus 1612 or the like. The memory component 1616 may be adapted to store computer readable instructions and data for effecting the processes and behavior of the components 1602-1606, and subcomponents thereof, or the processor 1610, or the methods disclosed herein. The memory component 1616 may retain instructions for executing functions associated with the components 1602-1606. While shown as being external to the memory 1616, it is to be understood that the components 1602-1606 can exist within the memory 1616.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a non-transitory computer-readable medium. Non-transitory computer-readable media includes both computer storage media. Storage media may include any available media that can be accessed by a computer. By way of example, and not limitation, such non-transitory computer-readable media include may include RAM, ROM, EEPROM, CD-ROM or other optical disc storage, magnetic disk storage or other magnetic storage devices, or any other medium that can be used to carry or store desired program code in the form of instructions or data structures and that can be accessed by a computer. Disk and disc, as used herein, includes Compact Disc (CD), laser disc, optical disc, Digital Versatile Disc (DVD), floppy disk and Blu-ray disc, where "disk" usually refers to a medium that holds data using magnetic encoding, while "disc" usually refers to a medium that holds data using optical encoding. Combinations of the above should also be included within the scope of non-transitory computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for controlling transmission of an opportunistic Data Optimized (DO) beacon by a base station of a wireless communication system, the method comprising:
    maintaining a numeric counter indicating a number of pending DO registrations in a base station memory;
    triggering initiation of a DO beacon transmission in response to completing a user registration for 1 times Radio Transmission Technology (1×RTT) wireless transmission at the base station at a time when the numeric counter indicates at least one pending DO registration; and
    transmitting 1×RTT discovery bursts for n number of 1×RTT frequencies in corresponding signals, with signals for respective frequencies transmitted one after another in a repeating sequence.

2. The method of claim 1, further comprising limiting how often triggering initiation of the DO beacon transmission is performed in response to at least one timer.

3. The method of claim 1, further comprising indicating a number of pending DO registrations by incrementing and decrementing the counter in offsetting amounts corresponding to respective different events of completing a 1×RTT user registration and completing a DO user registration.

4. The method of claim 1, further comprising transmitting the DO beacon for a first duration at times, and at other times, transmitting the DO beacon for a second duration substantially longer than the first duration.

5. The method of claim 4, wherein maintaining a numeric counter further includes maintaining separate counters, a first numeric counter indicating a number of pending DO registrations since the last instance of transmitting the DO beacon for the first duration, and a second numeric counter indicating a number of pending DO registrations since the last instance of transmitting the DO beacon for the second duration minus a current value of the first numeric counter.

6. The method of claim 1, further comprising transmitting additional bursts configured as an 1×RTT beacon in between the periodic bursts configured as the DO beacon.

7. The method of claim 1, further comprising transmitting the 1×RTT bursts at an increased power level every Nth cycle of the repeating sequence, wherein N is an integer greater than 1.

8. The method of claim 1, further comprising transmitting each of the signals for a duration determined at least in part by: a defined number of all 1×RTT paging slots used for paging 1×RTT receivers and an estimated constant delay value greater than zero.

9. An apparatus, comprising:
    at least one processor configured for: maintaining a numeric counter indicating a number of pending DO registrations in a base station memory, triggering initiation of a DO beacon transmission in response to completing a user registration for 1 times Radio Transmission Technology (1×RTT) wireless transmission at the base station at a time when the numeric counter indicates at least one pending DO registration, and transmitting 1×RTT discovery bursts for n number of 1×RTT frequencies in corresponding signals, with signals for respective frequencies transmitted one after another in a repeating sequence; and
    a memory coupled to the at least one processor for storing data.

10. The apparatus of claim 9, wherein the processor is further configured for limiting how often triggering initiation of the DO beacon transmission is performed in response to at least one timer.

11. The apparatus of claim 9, wherein the processor is further configured for indicating a number of pending DO registrations by incrementing and decrementing the counter in offsetting amounts corresponding to respective different events of completing a 1×RTT user registration and completing a DO user registration.

12. The apparatus of claim 9, wherein the processor is further configured for transmitting the DO beacon for a first duration at times, and at other times, transmitting the DO beacon for a second duration substantially longer than the first duration.

13. The apparatus of claim 12, wherein the processor is further configured for maintaining the numeric counter further comprising maintaining separate counters, a first numeric counter indicating a number of pending DO registrations since the last instance of transmitting the DO beacon for the first duration, and a second numeric counter indicating a number of pending DO registrations since the last instance of transmitting the DO beacon for the second duration minus a current value of the first numeric counter.

14. The apparatus of claim 9, wherein the processor is further configured for transmitting additional bursts configured as an 1×RTT beacon in between the periodic bursts configured as the DO beacon.

15. The apparatus of claim 9, wherein the processor is further configured for transmitting the 1×RTT bursts at an increased power level every Nth cycle of the repeating sequence, wherein N is an integer greater than 1.

16. The apparatus of claim 9, wherein the processor is further configured for transmitting each of the signals for a duration determined at least in part by: a defined number of all 1×RTT paging slots used for paging 1×RTT receivers and an estimated constant delay value greater than zero.

17. An apparatus, comprising:

means for maintaining a numeric counter indicating a number of pending DO registrations in a base station memory;

means for triggering initiation of a DO beacon transmission in response to completing a user registration for 1 times Radio Transmission Technology (1×RTT) wireless transmission at the base station at a time when the numeric counter indicates at least one pending DO registration; and means for transmitting 1×RTT discovery bursts for n number of 1×RTT frequencies in corresponding signals, with signals for respective frequencies transmitted one after another in a repeating sequence.

18. A computer program product, comprising:

a non-transitory computer-readable medium comprising code for causing a computer to perform the method comprising: maintaining a numeric counter indicating a number of pending DO registrations in a base station memory, triggering initiation of a DO beacon transmission in response to completing a user registration for 1 times Radio Transmission Technology (1×RTT) wireless transmission at the base station at a time when the numeric counter indicates at least one pending DO registration, and transmitting 1×RTT discovery bursts for n number of 1×RTT frequencies in corresponding signals, with signals for respective frequencies transmitted one after another in a repeating sequence.

* * * * *